United States Patent
Glew et al.

(10) Patent No.: US 9,098,608 B2
(45) Date of Patent: Aug. 4, 2015

(54) PROCESSOR CONFIGURED TO ALLOCATE RESOURCES USING AN ENTITLEMENT VECTOR

(75) Inventors: Andrew F. Glew, Hillsboro, OR (US); Daniel A. Gerrity, Seattle, WA (US); Clarence T. Tegreene, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 628 days.

(21) Appl. No.: 13/317,834

(22) Filed: Oct. 28, 2011
(Under 37 CFR 1.47)

(65) Prior Publication Data
US 2013/0111491 A1    May 2, 2013

(51) Int. Cl.
| G06F 9/455 | (2006.01) |
| G06F 9/46 | (2006.01) |
| G06F 11/34 | (2006.01) |
| G06F 11/30 | (2006.01) |
| G06F 9/50 | (2006.01) |

(52) U.S. Cl.
CPC .......... *G06F 11/3409* (2013.01); *G06F 9/5005* (2013.01); *G06F 11/30* (2013.01); *G06F 11/3058* (2013.01); *G06F 2209/508* (2013.01)

(58) Field of Classification Search
None
See application file for complete search history.

(56) References Cited

U.S. PATENT DOCUMENTS

| 4,525,599 A | 6/1985 | Curran et al. |
| 5,437,032 A * | 7/1995 | Wolf et al. .................... 718/103 |
| 5,623,637 A | 4/1997 | Jones et al. |
| 6,006,328 A | 12/1999 | Drake |
| 6,057,598 A | 5/2000 | Payne et al. |
| 6,145,064 A | 11/2000 | Long et al. |
| 6,154,741 A * | 11/2000 | Feldman ............................... 1/1 |
| 6,199,055 B1 | 3/2001 | Kara et al. |
| 6,654,745 B2 | 11/2003 | Feldman |
| 6,996,547 B1 | 2/2006 | Tugenberg et al. |
| 7,054,190 B2 | 5/2006 | Hanyu et al. |
| 7,107,176 B2 | 9/2006 | Henry et al. |
| 7,124,170 B1 | 10/2006 | Sibert |
| 7,165,150 B2 | 1/2007 | Alverson et al. |
| 7,191,185 B2 * | 3/2007 | Dweck et al. ................. 707/694 |
| 7,221,600 B2 | 5/2007 | Hara et al. |
| 7,284,000 B2 * | 10/2007 | Kuehr-McLaren et al. .......... 1/1 |

(Continued)

FOREIGN PATENT DOCUMENTS

WO     WO 01/99075 A2    12/2001

OTHER PUBLICATIONS

Wang et al., "AppRAISE: Application-Level Performance Management in Virtualized Server Environments", 2009.*

(Continued)

*Primary Examiner* — Meng An
*Assistant Examiner* — Bradley Teets

(57) ABSTRACT

An embodiment or embodiments of an information handling apparatus are adapted to facilitate resource allocation using an entitlement vector comprising multiple fields that are respectively directed to multiple different resources or capabilities. In illustrative embodiments, an information handling apparatus can comprise an entitlement vector configured with a plurality of bit fields at least partly corresponding to a plurality of resources and operable to specify the resources used by at least one object of a plurality of a plurality of objects. The information handling apparatus can further comprise logic operable to allocate the resources to the at least one object based on entitlement as specified by the entitlement vector.

32 Claims, 22 Drawing Sheets

(56) References Cited

U.S. PATENT DOCUMENTS

| | | | |
|---|---|---|---|
| 7,379,999 B1 | 5/2008 | Zhou et al. | |
| 7,395,414 B2 | 7/2008 | Le et al. | |
| 7,502,946 B2 | 3/2009 | Perkins et al. | |
| 7,533,273 B2 | 5/2009 | Patariu et al. | |
| 7,549,054 B2* | 6/2009 | Brodie et al. | 713/182 |
| 7,594,111 B2 | 9/2009 | Kiriansky et al. | |
| 7,620,941 B1 | 11/2009 | Leventhal | |
| 7,644,162 B1 | 1/2010 | Zhu et al. | |
| 7,676,578 B1 | 3/2010 | Zhu et al. | |
| 7,757,282 B2 | 7/2010 | Pandit et al. | |
| 7,844,733 B2* | 11/2010 | Betts et al. | 709/242 |
| 7,861,305 B2 | 12/2010 | McIntosh et al. | |
| 7,870,610 B1 | 1/2011 | Mitchell et al. | |
| 7,873,998 B1 | 1/2011 | Wilkinson et al. | |
| 7,877,585 B1 | 1/2011 | Coon et al. | |
| 7,953,986 B2 | 5/2011 | Lee | |
| 7,958,558 B1 | 6/2011 | Leake et al. | |
| 8,022,724 B1 | 9/2011 | Jenkins, IV | |
| 8,099,574 B2 | 1/2012 | Savagaonkar et al. | |
| 8,136,158 B1 | 3/2012 | Sehr et al. | |
| 8,146,106 B2 | 3/2012 | Kim et al. | |
| 8,281,388 B1 | 10/2012 | Sobel et al. | |
| 8,286,250 B1 | 10/2012 | Le et al. | |
| 8,312,509 B2 | 11/2012 | Zimmer et al. | |
| 8,381,192 B1 | 2/2013 | Drewry et al. | |
| 8,397,238 B2 | 3/2013 | Venkumahanti et al. | |
| 8,473,754 B2 | 6/2013 | Jones et al. | |
| 8,510,827 B1 | 8/2013 | Leake et al. | |
| 8,516,583 B2 | 8/2013 | Thomas et al. | |
| 8,555,390 B2 | 10/2013 | de la Crouee et al. | |
| 8,683,581 B2 | 3/2014 | Lefloch | |
| 8,688,583 B2 | 4/2014 | Boccon-Gibod et al. | |
| 8,694,947 B1* | 4/2014 | Venkataramani et al. | 716/132 |
| 2002/0040420 A1 | 4/2002 | Yamauchi et al. | |
| 2002/0075844 A1 | 6/2002 | Hagen | |
| 2002/0141577 A1 | 10/2002 | Ripley et al. | |
| 2002/0142833 A1 | 10/2002 | Tsuchida et al. | |
| 2002/0152212 A1 | 10/2002 | Feldman | |
| 2002/0156939 A1 | 10/2002 | Armstrong et al. | |
| 2002/0166058 A1 | 11/2002 | Fueki | |
| 2003/0046238 A1 | 3/2003 | Nonaka et al. | |
| 2003/0084308 A1 | 5/2003 | Van Rijnswou | |
| 2003/0149869 A1 | 8/2003 | Gleichauf | |
| 2003/0182436 A1 | 9/2003 | Henry | |
| 2003/0187974 A1 | 10/2003 | Burbeck et al. | |
| 2004/0054925 A1 | 3/2004 | Etheridge et al. | |
| 2004/0088691 A1 | 5/2004 | Hammes et al. | |
| 2004/0116183 A1 | 6/2004 | Prindle | |
| 2004/0117639 A1 | 6/2004 | Mowery | |
| 2004/0117790 A1 | 6/2004 | Rhine | |
| 2004/0153318 A1 | 8/2004 | Chamberlain | |
| 2004/0199763 A1 | 10/2004 | Freund | |
| 2005/0060710 A1 | 3/2005 | Kush | |
| 2005/0138074 A1 | 6/2005 | O'Connor et al. | |
| 2005/0160428 A1* | 7/2005 | Ayachitula et al. | 718/104 |
| 2005/0171903 A1 | 8/2005 | Yacobi et al. | |
| 2005/0177596 A1 | 8/2005 | Wu et al. | |
| 2005/0195975 A1 | 9/2005 | Kawakita | |
| 2005/0213751 A1 | 9/2005 | Apostolopoulos et al. | |
| 2005/0232415 A1 | 10/2005 | Little et al. | |
| 2005/0268075 A1 | 12/2005 | Caprioli et al. | |
| 2006/0005082 A1* | 1/2006 | Fossum et al. | 714/42 |
| 2006/0021054 A1 | 1/2006 | Costa et al. | |
| 2006/0161715 A1 | 7/2006 | Hamaguchi | |
| 2006/0161978 A1 | 7/2006 | Abadi et al. | |
| 2007/0022287 A1 | 1/2007 | Beck et al. | |
| 2007/0079304 A1 | 4/2007 | Zheng et al. | |
| 2007/0101433 A1 | 5/2007 | Louch et al. | |
| 2007/0240215 A1 | 10/2007 | Flores et al. | |
| 2007/0250837 A1* | 10/2007 | Herington et al. | 718/105 |
| 2008/0005586 A1 | 1/2008 | Munguia | |
| 2008/0028467 A1 | 1/2008 | Kommareddy et al. | |
| 2008/0052541 A1 | 2/2008 | Ginter et al. | |
| 2008/0104004 A1 | 5/2008 | Brave et al. | |
| 2008/0114990 A1 | 5/2008 | Hilbert et al. | |
| 2008/0168279 A1 | 7/2008 | Kanai | |
| 2008/0222397 A1 | 9/2008 | Wilkerson et al. | |
| 2008/0222532 A1 | 9/2008 | Mester et al. | |
| 2008/0250216 A1 | 10/2008 | Kershaw et al. | |
| 2008/0256346 A1 | 10/2008 | Lee et al. | |
| 2008/0263663 A1 | 10/2008 | Ide et al. | |
| 2008/0276317 A1 | 11/2008 | Chandola et al. | |
| 2008/0279371 A1 | 11/2008 | Lee et al. | |
| 2008/0301467 A1 | 12/2008 | Saito | |
| 2008/0313482 A1 | 12/2008 | Karlapalem et al. | |
| 2008/0320565 A1 | 12/2008 | Buch et al. | |
| 2009/0006755 A1* | 1/2009 | Illikkal et al. | 711/126 |
| 2009/0007125 A1 | 1/2009 | Barsness et al. | |
| 2009/0028135 A1 | 1/2009 | Mantripragada et al. | |
| 2009/0038014 A1 | 2/2009 | Force et al. | |
| 2009/0063824 A1 | 3/2009 | Leaback et al. | |
| 2009/0083520 A1 | 3/2009 | Kanemura | |
| 2009/0106563 A1 | 4/2009 | Cherpantier | |
| 2009/0144557 A1 | 6/2009 | Sutton | |
| 2009/0172686 A1 | 7/2009 | Chen et al. | |
| 2009/0183263 A1 | 7/2009 | McMichael et al. | |
| 2009/0187771 A1 | 7/2009 | McLellan, Jr. | |
| 2009/0210881 A1 | 8/2009 | Duller | |
| 2009/0222910 A1 | 9/2009 | Le Bihan et al. | |
| 2009/0265712 A1* | 10/2009 | Herington | 718/103 |
| 2009/0282474 A1 | 11/2009 | Chen et al. | |
| 2009/0320129 A1 | 12/2009 | Pan et al. | |
| 2009/0320136 A1 | 12/2009 | Lambert et al. | |
| 2009/0327718 A1 | 12/2009 | Hirai | |
| 2010/0017638 A1 | 1/2010 | Ghose | |
| 2010/0165991 A1 | 7/2010 | Veal et al. | |
| 2010/0191349 A1 | 7/2010 | Munaga | |
| 2010/0269168 A1 | 10/2010 | Hegli et al. | |
| 2010/0281273 A1 | 11/2010 | Lee et al. | |
| 2010/0299305 A1 | 11/2010 | Laxman et al. | |
| 2010/0318998 A1* | 12/2010 | Golla | 718/104 |
| 2011/0029140 A1 | 2/2011 | Jordan et al. | |
| 2011/0072292 A1 | 3/2011 | Khawand et al. | |
| 2011/0129024 A1 | 6/2011 | Karthik et al. | |
| 2011/0131402 A1 | 6/2011 | Mittal | |
| 2011/0131550 A1 | 6/2011 | Burckhardt et al. | |
| 2011/0131658 A1 | 6/2011 | Bahl | |
| 2011/0138124 A1 | 6/2011 | Hill et al. | |
| 2011/0138473 A1 | 6/2011 | Yee et al. | |
| 2011/0179176 A1 | 7/2011 | Ravichandran et al. | |
| 2011/0202927 A1 | 8/2011 | Miloushev et al. | |
| 2011/0289586 A1 | 11/2011 | Kc et al. | |
| 2011/0307382 A1 | 12/2011 | Siegel et al. | |
| 2011/0314254 A1 | 12/2011 | Smriti et al. | |
| 2011/0320793 A1 | 12/2011 | Bell, Jr. et al. | |
| 2012/0079492 A1 | 3/2012 | Chambliss et al. | |
| 2012/0102489 A1 | 4/2012 | Staiman et al. | |
| 2012/0159183 A1 | 6/2012 | Adams et al. | |
| 2012/0179952 A1 | 7/2012 | Tuyls et al. | |
| 2012/0185863 A1* | 7/2012 | Krstic et al. | 718/104 |
| 2012/0210325 A1 | 8/2012 | de Lind van Wijngaarden et al. | |
| 2012/0221591 A1 | 8/2012 | Yerneni et al. | |
| 2012/0233698 A1 | 9/2012 | Watters et al. | |
| 2012/0255018 A1 | 10/2012 | Sallam | |
| 2012/0255021 A1 | 10/2012 | Sallam | |
| 2012/0265975 A1 | 10/2012 | Kimelman | |
| 2012/0266243 A1 | 10/2012 | Turkulainen | |
| 2012/0278903 A1 | 11/2012 | Pugh | |
| 2013/0024867 A1 | 1/2013 | Glew et al. | |
| 2013/0081039 A1 | 3/2013 | Glew et al. | |
| 2013/0086687 A1 | 4/2013 | Chess et al. | |
| 2013/0111489 A1 | 5/2013 | Glew et al. | |
| 2013/0111491 A1 | 5/2013 | Glew et al. | |
| 2013/0246605 A1 | 9/2013 | Mahadik et al. | |
| 2013/0305243 A1* | 11/2013 | Hiki | 718/1 |

OTHER PUBLICATIONS

Liu et al., "Adaptive Entitlement Control of Resource Containers on Shared Servers", 2005.*

Liu et al., "Optimal Multivariate Control for Differentiated Services on a Shared Hosting Platform", 2007.*

Abadi et al.; "Control-Flow Integrity: Principles, Implementations, and Applications"; bearing a date of Nov. 1, 2004; pp. 1-33.

(56) References Cited

OTHER PUBLICATIONS

Kiriansky et al.; "Secure Execution Via Program Shepherding"; Proceedings of the 11th USENIX Security Symposium; bearing a date of Aug. 2002, created on Dec. 9, 2013; pp. 1-16; San Francisco, CA.

Stone, Harold S.; "A Logic-in-Memory Computer"; IEEE Transactions on Computers; bearing a date of Jan. 1970; pp. 73-78.

Bird et al.; "Lighthouse: Hardware Support for Enforcing Information Flow Control on ManyCore Systems"; bearing a date of 2008; 10 pages.

Clause et al.; "Dytan: A Generic Dynamic Taint Analysis Framework"; ISSTA '07; bearing a date of Jul. 9-12, 2007; pp. 196-206; ACM.

Ho et al.; "Practical Taint-Based Protection using Demand Emulation"; EuroSys '06; bearing a date of Apr. 18-21, 2006; 13 pages; ACM.

Newsome et al.; "Dynamic Taint Analysis for Automation Detection, Analysis, and Signature Generation of Exploits on Commodity Software"; Carnegie Mellon University Research Showcase; bearing a date of Jan. 1, 2005; 18 pages.

Schwartz et al.; "All You Ever Wanted to Know About Dynamic Taint Analysis and Forward Symbolic Execution (but might have been afraid to ask)"; 2010 IEEE Symposium on Security and Privacy; bearing a date of 2010; pp. 317-331; IEEE.

Song et al.; "BitBlaze: A New Approach to Computer Security via Binary Analysis"; ICISS 2008; bearing a date of 2008; pp. 1-25; Springer-Verlag Berlin Heidelberg.

Yin et al.; "Panorama: Capturing System-wide Information Flow for Malware Detection and Analysis"; CCS '07; bearing a date of Oct. 29-Nov. 2, 2007; pp. 116-127; ACM.

Zeldovich et al.; "Hardware Enforcement of Application Security Policies Using Tagged Memory"; bearing a date of 2008, printed Feb. 7, 2013; pp. 1-16; located at: static.usenix.org/events/osdi08/tech/full_papers/zeldovich/zeldovich_html/.

Zhang et al.; "Neon: System Support for Derived Data Management"; VEE '10; bearing a date of Mar. 17-19, 2010; 12 pages; ACM.

Adya et al.; "FARSITE: Federated, Available, and Reliable Storage for an Incompletely Trusted Environment"; 5th Symposium on Operating Systems Design and Implementation; bearing a date of Dec. 2002; pp. 1-14; Boston, MA.

Kolbitsch et al.; "Extending Mondrian Memory Protection"; Information Systems and Technology Panel (IST) Symposium, Tallinn, Estonia; bearing a date of Nov. 22-23, 2010; pp. 10-1 through 10-18 and 1 Report Documentation Page; NATO-OTAN.

"Instruction Set"; Wikipedia; bearing a date of May 15, 2010; pp. 1-10; located at: en.wikipedia.org/wiki/Instruction_set.

"Opcode"; Wikipedia; bearing a date of Oct. 26, 2014; pp. 1-2; located at: en.wikipedia.org/w/index.php?title=Opcode&oldid=175723708.

\* cited by examiner

OBJECT 1:

OBJECT 2:

OBJECT 3:

OBJECT N:

OBJECT 1:

OBJECT 2:

OBJECTS 3&4:

⋮

OBJECT N:

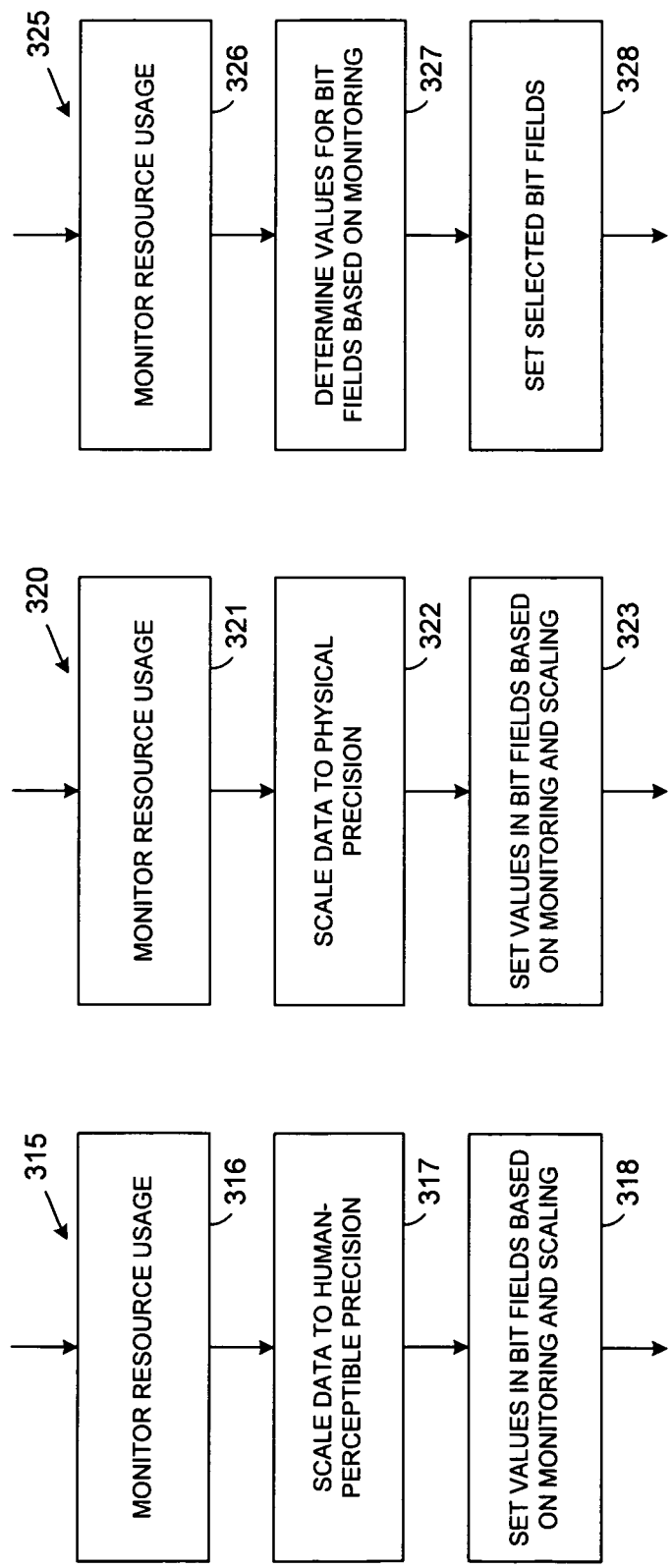

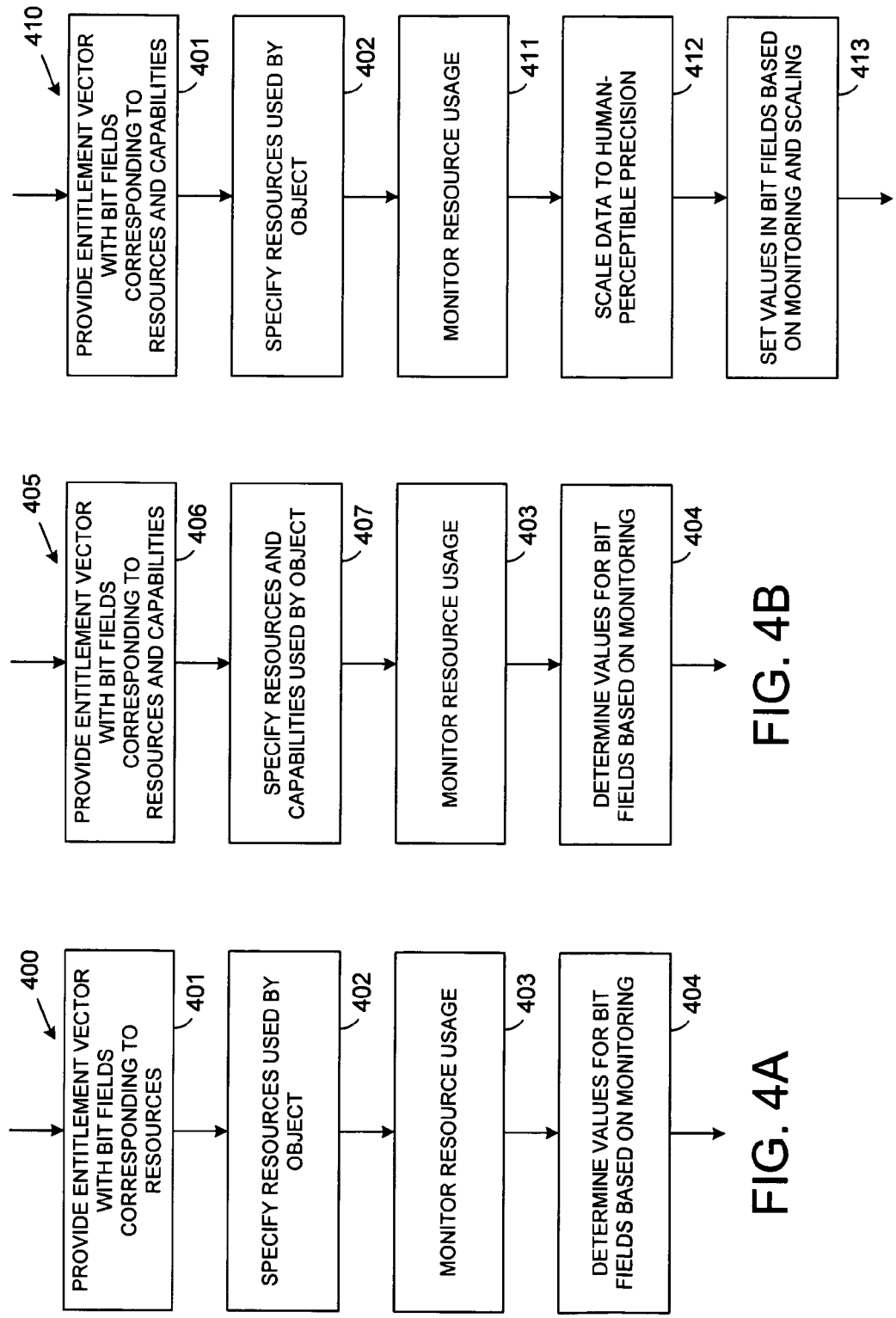

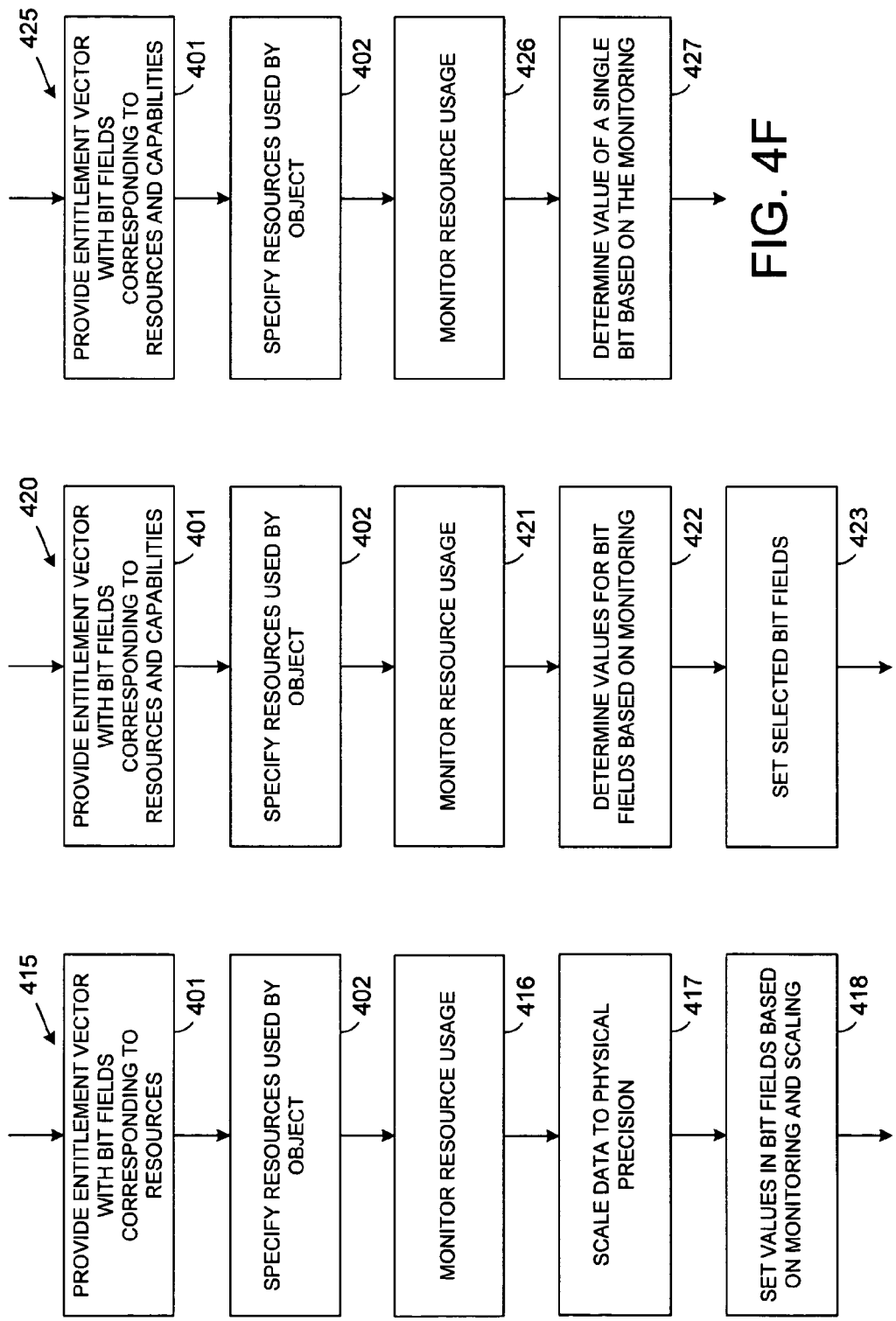

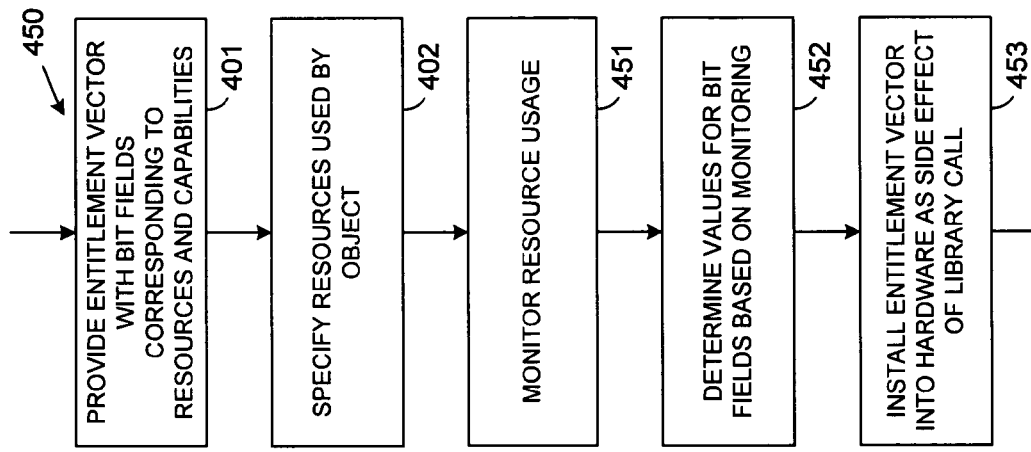

PROCESSOR CONFIGURED TO ALLOCATE RESOURCES USING AN ENTITLEMENT VECTOR

CROSS REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the United States Patent and Trademark Office (USPTO) extra-statutory requirements (described more fully below), the present application is:

1. For purposes of the USPTO extra-statutory requirements, the present application constitutes a continuation-in-part of U.S. patent application Ser. No. 13/136,024 entitled CONTROL FLOW INTEGRITY filed on Jul. 19, 2011, and naming Andrew F. Glew, Daniel A. Gerrity, and Clarence T. Tegreene as inventors, which is currently co-pending, or is an application of which a currently co-pending application is entitled to the benefit of the filing date.
2. For purposes of the USPTO extra-statutory requirements, the present application constitutes a continuation-in-part of U.S. patent application Ser. No. 13/136,400 entitled ENCRYPTED MEMORY filed on Jul. 29, 2011, and naming Andrew F. Glew, Daniel A. Gerrity, and Clarence T. Tegreene as inventors, which is currently co-pending, or is an application of which a currently co-pending application is entitled to the benefit of the filing date.
3. For purposes of the USPTO extra-statutory requirements, the present application constitutes a continuation-in-part of U.S. patent application Ser. No. 13/136,401 entitled FINE-GRAINED SECURITY IN FEDERATED DATA SETS filed on Jul. 29, 2011, and naming Andrew F. Glew, Daniel A. Gerrity, and Clarence T. Tegreene as inventors, which is currently co-pending, or is an application of which a currently co-pending application is entitled to the benefit of the filing date.
4. For purposes of the USPTO extra-statutory requirements, the present application constitutes a continuation-in-part of U.S. patent application Ser. No. 13/136,666 entitled SECURITY PERIMETER filed on Aug. 4, 2011, and naming Andrew F. Glew, Daniel A. Gerrity, and Clarence T. Tegreene as inventors, which is currently co-pending, or is an application of which a currently co-pending application is entitled to the benefit of the filing date.
5. For purposes of the USPTO extra-statutory requirements, the present application constitutes a continuation-in-part of U.S. patent application Ser. No. 13/136,670 entitled PROCESSOR OPERABLE TO ENSURE CODE INTEGRITY filed on Aug. 4, 2011, and naming Andrew F. Glew, Daniel A. Gerrity, and Clarence T. Tegreene as inventors, which is currently co-pending, or is an application of which a currently co-pending application is entitled to the benefit of the filing date.
6. For purposes of the USPTO extra-statutory requirements, the present application constitutes a continuation-in-part of U.S. patent application Ser. No. 13/199,368 entitled INTRUSTION DETECTION USING TAINT ACCUMULATION filed on Aug. 26, 2011, and naming Andrew F. Glew, Daniel A. Gerrity, and Clarence T. Tegreene as inventors, which is currently co-pending, or is an application of which a currently co-pending application is entitled to the benefit of the filing date.
7. For purposes of the USPTO extra-statutory requirements, the present application constitutes a continuation-in-part of U.S. patent application Ser. No. 13/200,547 entitled INTRUSTION SET ADAPTED FOR SECURITY RISK MONITORING filed on Sep. 24, 2011, and naming Andrew F. Glew, Daniel A. Gerrity, and Clarence T. Tegreene as inventors, which is currently co-pending, or is an application of which a currently co-pending application is entitled to the benefit of the filing date.
8. For purposes of the USPTO extra-statutory requirements, the present application constitutes a continuation-in-part of U.S. patent application Ser. No. 13/200,557 entitled RESOURCE ALLOCATION USING ENTITLEMENTS filed on Sep. 24, 2011, and naming Andrew F. Glew, Daniel A. Gerrity, and Clarence T. Tegreene as inventors, which is currently co-pending, or is an application of which a currently co-pending application is entitled to the benefit of the filing date.
9. For purposes of the USPTO extra-statutory requirements, the present application constitutes a continuation-in-part of U.S. patent application Ser. No. 13/200,550 entitled RESOURCE ALLOCATION USING A LIBRARY WITH ENTITLEMENT filed on Sep. 24, 2011, and naming Andrew F. Glew, Daniel A. Gerrity, and Clarence T. Tegreene as inventors, which is currently co-pending, or is an application of which a currently co-pending application is entitled to the benefit of the filing date.
10. For purposes of the USPTO extra-statutory requirements, the present application constitutes a continuation-in-part of U.S. patent application Ser. No. 13/200,556 entitled RESOURCE ALLOCATION WITH ENTITLEMENT HINTS filed on Sep. 24, 2011, and naming Andrew F. Glew, Daniel A. Gerrity, and Clarence T. Tegreene as inventors, which is currently co-pending, or is an application of which a currently co-pending application is entitled to the benefit of the filing date.
11. For purposes of the USPTO extra-statutory requirements, the present application constitutes a continuation-in-part of U.S. patent application Ser. No. 13/317,826 entitled ENTITLEMENT VECTOR FOR MANAGING RESOURCE ALLOCATION filed on Oct. 28, 2011, and naming Andrew F. Glew, Daniel A. Gerrity, and Clarence T. Tegreene as inventors, which is currently co-pending, or is an application of which a currently co-pending application is entitled to the benefit of the filing date.
12. For purposes of the USPTO extra-statutory requirements, the present application constitutes a continuation-in-part of U.S. patent application Ser. No. 13/317,825 entitled TAINT VECTOR LOCATIONS AND GRANULARITY filed on Oct. 28, 2011, and naming Andrew F. Glew, Daniel A. Gerrity, and Clarence T. Tegreene as inventors, which is currently co-pending, or is an application of which a currently co-pending application is entitled to the benefit of the filing date.

The United States Patent and Trademark Office (USPTO) has published a notice to the effect that the USPTO's computer programs require that patent applicants reference both a serial number and indicate whether an application is a continuation or continuation in part. Stephen G. Kunin, Benefit of Prior-Filed Application, USPTO Electronic Official Gazette, Mar. 18, 2003. The present applicant entity has provided a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

Resource allocation in data processing and computing is used for applications to run on a system. A program initiated by a user generates a process. A computer allocates resources for the process to be run. Typical resources include access to a section of computer memory, data in a device interface buffer, one or more files, a suitable amount of processing power, and the like.

A computer with only a single processor can only perform one process at a time, regardless of the number of programs loaded by a user or initiated on start-up. Single-processor computers emulate the running of multiple programs concurrently because the processor multitasks, rapidly alternating between programs in very small time slices. Time allocation is automatic, however higher or lower priority may be given to certain processes with high priority programs typically allocated either more or larger slices of processor execution time.

On multi-processor computers, different processes can be allocated to different processors so that the computer can truly multitask.

SUMMARY

An embodiment or embodiments of an information handling apparatus are adapted to facilitate resource allocation using an entitlement vector comprising multiple fields that are respectively directed to multiple different resources or capabilities. In illustrative embodiments, an information handling apparatus can comprise an entitlement vector configured with a plurality of bit fields at least partly corresponding to a plurality of resources and operable to specify the resources used by at least one object of a plurality of a plurality of objects. The information handling apparatus can further comprise logic operable to allocate the resources to the at least one object based on entitlement as specified by the entitlement vector.

BRIEF DESCRIPTION OF THE DRAWINGS

Embodiments of the invention relating to both structure and method of operation may best be understood by referring to the following description and accompanying drawings:

FIGS. 4A through 4K are schematic flow diagrams which illustrate an embodiment or embodiments of a method operable in an information handling apparatus that enables dynamic modification of bit fields in entitlement vectors for allocating resources;

DETAILED DESCRIPTION

Figure 1A:
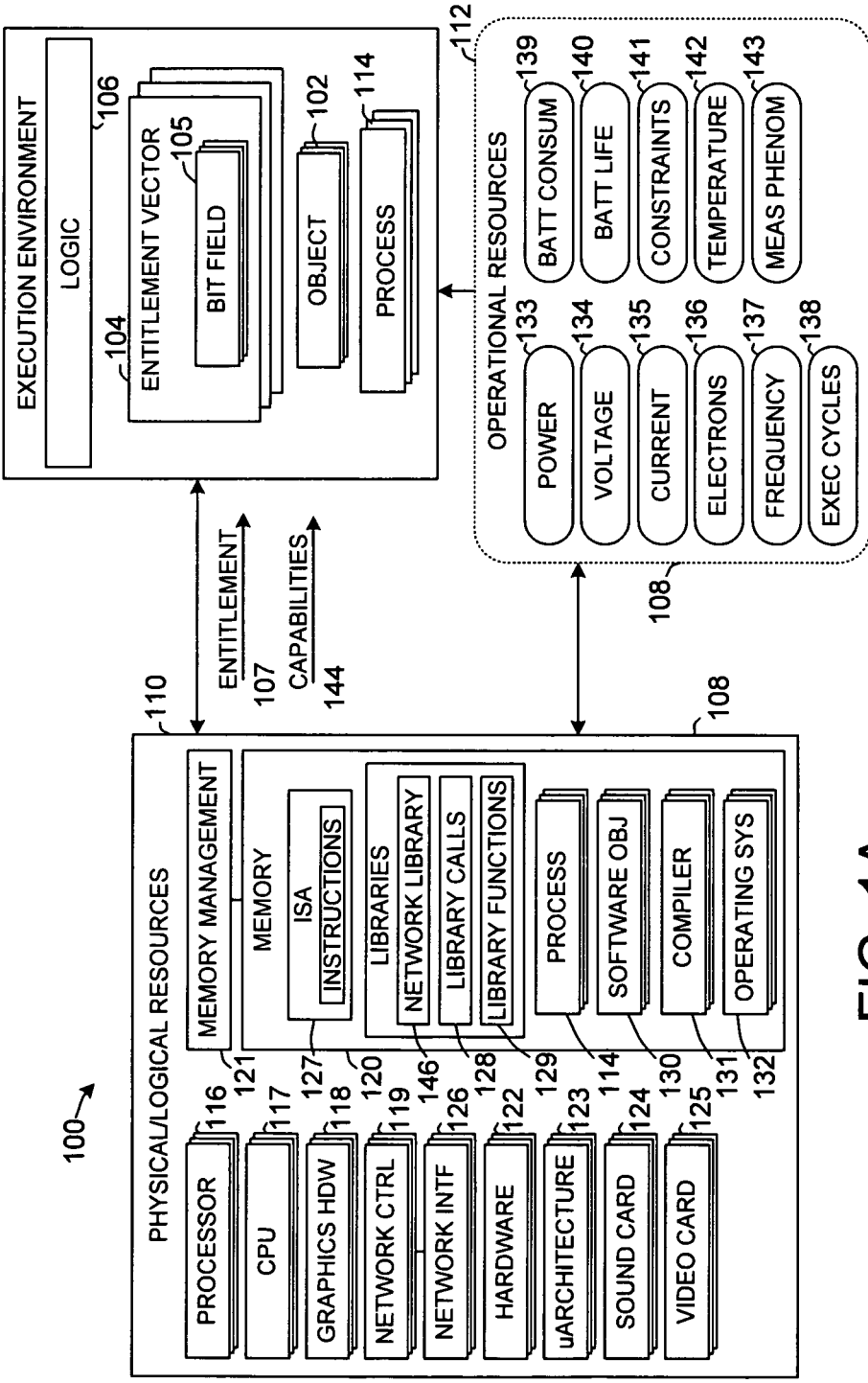
FIGS. 1A, 1B, 1C, and 1D are four schematic block diagrams

In various embodiments, computer systems and associated methods can be configured to include one or more of several improvements that facilitate resource handling.

Various aspects of resource allocation include hardware threading, computational limits, pooled resources, entitlements, and others. Resource allocation can be handled via various architectural aspects of a system including microarchitecture, instruction set architecture (ISA), operating system, and library calls. Software can associate capabilities with particular library functions or software objects. This software can be in the form of compiler, operating system, or others. The operating system can, for example, create a profile for any process running floating point operations and give that entitlement. Resources allocated include processors, central processing units (CPUs), graphics hardware, network controllers, memory, memory management, other hardware, and the like. Resources further include power, cycles, and the like.

Entitlements can be used to allocate resources. Entitlements can be defined as user-specified rights wherein a process is entitled to a predetermined percentage of power or of time. A scheduler or chooser can monitor entitlement values and schedule the next highest priority process. A particular scheme can allocate modulo by bit to avoid starving a process with lower entitlement. In some conditions, the level of entitlement can be overridden or adjusted. Entitlement can be set according to a predetermined algorithm which defines a "fair share" for the processes, for example round-robin, history-based, randomized, and the like, which are efficient since a large history need not be accumulated. Thus, an efficient and inexpensive hardware implementation is possible.

A metric can be specified which enables modification of a goal. A selected level of entitlement to resource consumption can be assigned to each process. One example scheme can be a short, low complexity method which is implemented while storing a limited operation history. For example, when running low on battery charge, a sequence 1-2-3-4-4-3-2-1 can be used to determine whether any of the processes is a resource glutton and can rank the processes on order of gluttony. The most gluttonous can be assigned the lowest priority. Another option can rank processes according to gluttony in combination with another factor of goodness (niceness). Processes can be ranked for the next cycle with the most gluttonous given last priority or can be ranked according to gluttony and one other nice system criterion. Monitoring and/or control can be performed highly efficiently if hardware, although either monitoring can be performed either in hardware or software in various embodiments. Power management units in CPUs can be used for monitoring, for example to monitor for increases or decreases in voltage or frequency, and for thread execution selection.

Capabilities can be used to perform monitoring and allocation of resources. For example, granting the capability to run video processing software can be combined with simultaneous granting of power capability.

Power is typically global to a process or to an individual CPU. Use of capabilities enables more refined control of power, for example power can be made specific to an object or library routine. With power global to a process, the process will continue to run in absence of a fault, a page fault, a disk access, or the like, and will run until blocked by the operating system scheduler, allowing high power consumption. Use of capabilities enables power to be controlled on a per-hardware thread granularity. Use of capabilities further enables power to be controlled specific to a per-hardware thread granularity for throttling power.

Processors can use instruction prefetch to improve execution speed by reducing wait states. The processor prefetches an instruction by request from main memory before the instruction is needed and, when retrieved from memory, placing the prefetched instruction in a cache. When needed, the instruction is quickly accessed from the cache. Prefetch can be used in combination with a branch prediction algorithm which anticipates results of execution to fetch predicted instructions in advance. Prefetches conventionally operate independently. In some embodiments, a processor disclosed herein can prefetch according to holistic monitoring of operating conditions such as voltage, frequency, and the like to more accurately determine or predict which instructions to prefetch.

The cache can be reconfigured dynamically, for example beginning with a single large, slow cache which can be divided into a relatively small subcache and a larger subcache to enable faster operation. In embodiments disclosed herein, operating characteristics can be monitored to generate information for dynamic reconfiguring of the cache. As a result of the monitored operating conditions, the cache can be selectively configured for slower or faster speed, larger and smaller cache subregions. In some conditions, part of the cache can be temporarily disabled, for example to save power. Monitoring of operating conditions can enable a suitable balance of considerations to determine whether part of the cache is to be disabled, for example determining whether the power saved in disabling part of the cache is appropriate in light of the power lost with a greater cache miss rate.

Disclosed system and method embodiments can use operating condition monitoring and holistic control at the level of calling an object. In an object-level paradigm, various objects or values (such as numbers, symbols, strings, and the like) can be combined to form other objects or values until the final result objects or values are obtained. New values can be formed from existing values by the application of various value-to-value functions, such as addition, concatenation, matrix inversion, and the like. Various objects have different impacts on system operations.

An example of an object which, when called, can have large consumption of power or other resources is video encoding which is a brute force, unintelligent algorithm which runs much more efficiently on dedicated hardware than a general CPU, and has real-time constraints. Video conferencing has similar real-time constraints.

Another object example is video games which perform many different tasks concurrently including processing geometry and processing video simultaneously, possibly processing speech for Skype communications, voice compression, input/output, and the like. Video games thus typically involve concurrent operation of multiple objects such as the game processing tasks and interface (Application Programming Interface, API) that perform different actions separately. The multiple objects are commonly run as separate threads, unless prohibitive due to the large amount of overhead in running threads that are not essential. Separate threads simplify programming.

In some configurations, applications, and conditions, multiple threads can be run wherein the threads need not be run in the same context.

Hyperthreading is a particular implementation of hardware threading. Software threading is a slightly different implementation of threading wherein the threads are often, but not always, related. In some implementations, a processor can include a GOAL register that can be used to set performance characteristics for particular threads. For example, if different routines (Skype, physics) are run in different threads, selected operating characteristics for the threads can be loaded into the GOAL register to give the threads separate issues. Allocating priority to the different threads can be difficult. In an illustrative system, priority to the threads can be allocated using a NICE utility which specifies acceptable performance for a particular operation and allows reduced priority in appropriate conditions for tasks that can be assigned lower priority with little or no consequence.

In an example implementation, priorities, particular types of priorities, and entitlements can be associated with particular library routines to facilitate management of relatively heuristic phenomena. A library can be constituted wherein entitlements are assigned to individual library routines. The library includes information for adjusting the priority of threads. In some configurations or applications, the library can support hint vectors, such as branch prediction hints to specify whether static prediction should be taken or not taken. In some embodiments, the library can be configured to support NICE-type handling of a hint vector.

A process scheduler can be constituted to support prioritized entitlements and resource allocations upon calling selected libraries. A typical embodiment includes such support in software, although hardware support can also be implemented. For example, a network library can include library routines adapted for heavy network usage so that resources giving access to the network are more important processes to schedule. More entitlements are allocated to network-related resources. Libraries can also be configured to handle secondary priorities that change dynamically. For example, a sound card can have a greater power priority and have a pattern of operation wherein a process uses a network card and possibly other subsystems in combination with the sound card. Thus, the network card and other subsystems can also be allocated a higher priority. Similarly, for a process which performs less modeling and number computation in lieu of higher input/output operations and sending of information, a higher level of priority can be allocated to input/output resources.

Entitlements can be used to specify operations of a library. For example, a library with entitlement to run a predetermined number of floating point operations per second can, in response to a condition of executing instructions with few or no floating point computations, use the condition as a hint to power down floating point hardware, thus saving power. Thus, if computations include fixed point operations but no floating point operations, an a priori indicator can be generated designating that the floating point hardware is not needed in the near future and can be powered down. A process can call a library and, if known that a resource is not needed, the resource can be temporarily halted, thereby changing the entitlement level of that process with respect to the resource (for example a floating point unit) to a very low point.

In the illustrative example, the entitlement level of the process with respect to the floating point unit can be changed to very low because the resource is not needed for a foreseeable duration. The process thus indicates to other processes a willingness to relinquish access to the source, for example a willingness to be "nice" about allowing others to use the resource, so that access is deferred in favor of any other process that uses the resource, or the resource is shut down if not currently needed by another process.

Rather than have hardware determine demand for a resource after instructions have been executed, the illustrative system and method can use a call to a library or the result of making a call to the library as an indicator of entitlement niceness. This entitlement can be enforced in the manner of capabilities, for example by requesting access to a memory region, a request which may be denied. The library can give information regarding entitlement, thus giving a priori knowledge.

Resource allocation can also be managed using hints. An illustrative instruction that uses a hint is a hint that not much floating point computation is to be performed, a hint indicative of power demand. For example, hints to maintain power at a low level or to maintain power at a high level. An exception can create problems when using hints, since a hint is not unwound in the event of an exception. For example, for a hint to maintain high power, an exception which changes the condition but does not reset the hint allows hardware to remain in a high power mode, potentially forever. Examples of problems with hint processing in conditions of context switching include problems with unlocking memory locations.

In contrast to entitlements, capabilities enable mechanisms to unwind.

Entitlement Vector.

An entitlement vector may comprise multiple fields that are respectively directed to multiple different resources or capabilities. General examples may include, for example, floating point, power, arithmetic logic unit (ALU), graphics triangle computations, translation lookaside buffers (TLBs), virtual memory usage, and the like. The entitlement vector can thus be used, for example, to power down the TLB as no longer relevant to operation, or to enable usage of a wide range of virtual memory. Software can determine values for each of these fields, for example after monitoring, or the fields can be preconfigured. To maintain in hardware, an entitlement vector may be a suitable size, such as 256 bits. Values can be Boolean. Otherwise, values can be a number from a numerical range to indicate how much from a percentage or relative sense of a given resource is being requested. For example, a big number may be placed in an ALU field if significant usage of the ALU is expected.

Libraries or other objects (and associated threads) can request entitlements. Objects use resources to execute. For example, a networking library has greater usage of a network resource than other libraries or objects. Particular entitlements may be assigned to individual library routines using an entitlement vector, which can indicate expected capabilities to which an object may be entitled. Entitlements may be assigned via the entitlement vector. An entitlement vector may be used when selecting a thread for execution in a multi-threading environment in terms of aspects such as priority.

In some embodiments, an entitlement vector can be used as a hint for an object. Software or a manual determination can ascertain and/or specify what resources/capabilities are to be used by an object, such as a library. Code may be included, for example at the beginning of a library, to request particular resources in the form of an entitlement vector. The request may be a request for preferential scheduling, especially with regard to resources. Such code may be a hint, a data structure, a set of one or more bits, or the like in the library.

In some embodiments and/or applications an entitlement vector can be operable as a repercussion of a calling library. An entitlement vector can serve as a request for resources. The request may be realized as a call to a system call, such as a request to the operating system to allocate additional resources. A hint instruction can be provided to hardware, for example for hardware to use in scheduling. When a library call is made, an entitlement vector may be returned. An entitlement vector can be returned directly or by reference to an address/register location. Otherwise, an entitlement vector may be installed, for example in association with a register, as a result or side effect of making the library call.

An entitlement vector can be configured to handle field of scale. Human perception is limited. For data representing phenomena that are to be perceived by humans, the data size may be limited so that precision beyond what is human-perceptible may be omitted to conserve resources. Accordingly, a requested data resource can be scaled down or set to a maximum size. For example, finger prints do not require greater than 2 MB, and eyes can discern only "x" amount of resolution. Scale may also be applied to other parameters having a relevant precision that is constrained by the physical world. Thus, a field of the entitlement vector can specify scale. Examples of scale can be human scale, width of the accumulator, or any suitable scale. For example, for a finger print, a suitable scale can be no more than 2 MB.

The entitlement vector field can have a suitable predetermined data path width. Communication and computational data path widths may be large to accommodate data-intensive activities. A data path width entitlement vector field may request a reduction to or only a portion of a maximum available data path width. For example, perhaps only 128 bits of 1024 bits are needed. The other bits of the non-used data path width may be shared with another process or shut down to conserve energy. For example, a portion of a power-hungry super accumulator may be powered down in response to a data path width indication in a field of an entitlement vector. Thus, a field of the entitlement vector can be data path width, a similar concept to scale. A large instruction size, for example 1024 bits, wastes power, but typically only a portion of the bits are used at one time so that a desired subset of the bits can be activated, changing the data path width. The scale concept leads to the concept of a selected partial data path width. The data path width is part of the entitlement. For example, of 1024 bits logic can compute the number of bits actually needed and allocate that predetermined subset of bits, such as 128 bits. The data path field thus can be used to lower the data path width used of the available entitlement vector width, for example activating a super-accumulator data path width.

An entitlement vector can also be used to supply information for scheduling. Individual instruction pointers or threads can be associated with an entitlement vector. For example, four instruction pointers (IPs) can be associated respectively with four entitlement vectors. Logic for a thread chooser can schedule a next thread for execution based at least partly on an entitlement vector. Hence, an entitlement vector may affect priority of scheduling. For example, a glutton with low priority may be moved toward the back of a queue. A miserly resource user with a high priority, on the other hand, can be moved toward the front of the queue.

The entitlement vector can enable usage of selected scheduling functions. Different functions can be used to schedule threads with regard to entitlement vectors. Generally, a function (i) can be based at least partly on: a weight, an entitlement vector$_i$, and a usage level$_i$. A function can be, but is not necessarily, linear. For example, a sum of a product of a weight times an entitlement vector may be compared to a usage vector when considering priority for scheduling threads.

An entitlement vector and usage vector can be mutually associated. An entitlement vector for an object can be set by software. A usage vector may be determined by hardware by monitoring resource usage during execution. An entitlement vector and a usage vector can be combined into an uber-priority vector that can be used when scheduling threads.

In an example software embodiment, software can monitor the system over history, or can be preprogrammed, and fills in some sets in entitlement vector fields. Software can determine values for the fields and fill in the bits of data, possibly associated as a lookup table, an associated hash table, an extra field to call for a library, and the like. For a library call, an entitlement vector EV is returned. The entitlement vector can be received from various sources, for example from external to calling software. For example, the entitlement vector EV may be installed into hardware as a side effect of the library call.

A factor in determining whether the entitlement vector is handled in software or hardware is the size of the vector.

In an example hardware implementation, a suitable entitlement vector size is 256 bits, although any suitable size is possible. For example, a vector of 64K bits is generally considered too large for hardware implementation.

In some embodiments, an entitlement vector can be associated with each library. The entitlement vector can be used, for example, to eliminate floating point if desired, reduce the number of floating point operations if such operations are rarely used, reduce the scale as appropriate when full accumulator width is unnecessary, increase support for the ALU.

The entitlement vector can be implemented as a call with a memory address made in association with a call to a library which, for example, can return a pointer or address location to the entitlement vector.

Another field of the entitlement vector can be a chooser/thread selector. The entitlement vector can be used by the chooser/scheduler, which includes logic that performs operations based on a single entitlement vector or possibly relative entitlement vectors. Each Instruction Pointer (IP) or thread can have an associated entitlement vector. For example instruction pointers, for IP1, IP2, IP3, IP4, then four entitlement vectors can be allocated. Chooser/scheduler logic considers the entitlement vector when scheduling the next thread for computation. The logic informs the chooser/scheduler about how to make the selection. The logic can perform selected functions to make the choice and for scheduling, for example by elevating or decreasing priority of a thread.

An example function using an entitlement vector (EV) can compute the sum of weight times $EV_i$ compared to the usage vector of Thread$_i$, a simple target function for evaluating when to schedule threads from the highest priority to the lowest priority. Thus, for a thread with high priority and large requirement for resources, the thread can be elevated in the scheduling list and resources are likely to be allocated. In contrast, a thread that is a glutton for resources and has low priority is likely to be deferred by the scheduler, moving back or to the end of the list of scheduled threads. A high priority thread that consumes only limited resources is likely to be moved up in the schedule list, possibly to the front of the list.

In some embodiments, the entitlement vector supplied by a HINT instruction can be modified by a capability process. Illustratively, the entitlement vector can set entitlement to use X resources which can be limited by the operating system for example by reduced weighting or setting of maximum allowed resources. The entitlement vector can also be limited according to usage, wherein a thread using an inordinately large amount of resources can be limited when the high usage is detected or predicted.

The entitlement vector function $F_i(w_i, EV_i, v_i)$ of weight ($w_i$), entitlement vector ($EV_i$), and resource volume ($v_i$) can be either linear or non-linear.

The entitlement vector enables association of scheduling with functions. The entitlement vector further enables association of priority with functions.

One of the challenges in allocating resources is the potential for highly unpredictable changes in resource demand. For example, minor changes in workload can result in substantial variation in performance. Another challenge is unpredictable behavior in response to context switches from one process to another. One technique for dealing with these challenges is making a library call as a technique for determining whether a context switch occurred or, if not expecting to make a library call, perform an action that randomizes priority. If degradation results from making the library call, then performance can be monitored to determine whether performance is reduced. If so, priority of the threads can be randomized. Example techniques for randomization can include a Boltzmann search, simulated annealing, hop-around, other lateral computing techniques, and the like. A Boltzmann search can be performed by a Boltzmann machine, a stochastic recurrent neural network that is capable of learning internal representations and solving combinatoric problems. Simulated annealing is a computer technique used for answering difficult and complex problems based on simulation of how pure crystals form from a heated gaseous state. Instead of minimizing the energy of a block of metal or maximizing strength, the program can minimize or maximize an objective relevant to the problem at hand, specifically randomization to attain stable performance. In a hop-around technique, priority or other parameters can be bounced around to determine a local maximum but not global optimum. Search optimizations can be used to determine whether truly at a maximum value. The new results can be compared with an old optimum.

In some embodiments, a supervisor circuit, for example for thermal and/or overvoltage protection, can modify the entitlement vector.

Entitlement Vector for Power Control Monitoring.

The entitlement vector, for example in combination with a usage vector, can be used for monitoring power control. In various embodiments, power control monitoring can be performed remotely or locally, possibly by the operating system.

In an example embodiment, a user can supply an entitlement vector using instructions, for example by specification of the beginning and end of a function. The entitlement vector can be used in association with a performance monitoring unit which monitors and determines other entitlement vectors. In various embodiments, the entitlement vectors can be maintained separately or combined into a single effective entitlement vector.

Context Switches.

Context switches can be defined as switches from one process to another. In contrast, a thread can typically be considered limited to a single context. Standard threads and mock threads share resources including context and can have multiple processes, multiple threads within the same privilege level technically. However, a threading library and threading operating system can be created wherein threads are not limited to the same context. Threads can comprise simply a stack and an instruction pointer, and can run in the same address space, for example threads can run as different users in the same address space. In a case of multiple users accessing the same database, if the database is a shared-memory database, software or an interpreter can be responsible for ensuring that unauthorized user(s) cannot access certain data. In the case of users assigned different privilege levels or different threads in the same virtual memory address space assigned different privilege levels, different registers are assigned to particular users and/or threads, and thus switches between users and/or threads are context switches.

Privileges can be associated with a page, a page table, an actual physical memory address, a virtual memory address, and the like.

Combining Capabilities and Entitlement.

In some embodiments, the capabilities vector and the entitlement vector can be merged. In some aspects of operation, entitlement can be considered to be a capability. With entitlements specified, the associated performance capabilities and management of associated capabilities prevents unauthorized access to data and/or resources, and prevents system takeover, unless specifically allowed or enabled by a system call, improving security and enabling denial of service to attacks.

Merged capabilities and entitlement can be used to prevent microarchitectural denial of service. Denial of service is typically considered to arise from a hacker on a network blocking access by using up all or a substantial part of network bandwidth. For example, when operating on a virtual machine in a cloud computing platform (such as Amazon Elastic Compute Cloud (EC2)) a job can be run that thrashes the cache, resulting in an architectural denial of service in response. Preventative remedies can include checking for performance counters and preventing such unauthorized accesses. Microarchitectural remedies can also be used such as implementing microarchitectural covert channels in which, for various types of code, secret keys running on the same virtual machine can be detected. Similarly, microarchitectural covert channels can be used to monitor timing of code to detect intrusion and to detect whether a bit is set in a particular bit position which may indicate intrusion. Microarchitectural techniques can thus include timing channels and covert channels for use whenever a shared resource is to be modulated. Covert channels can be applied, for example, in modulating a disk arm, detecting seeks on a file system.

In various embodiments, operations implementing and using the entitlement vector can be executed by software in a processor, by microcode, in logic, in hardware, or the like.

Hardware Threading.

Several aspects of hardware threading are currently implemented in processors such as CPUs. Simultaneous threading (SMT), hyperthreading, or simultaneous hyperthreading relate to hardware execution of two or four threads selected for running at any time, managed according to many fine-grained scheduling decisions. In a cycle, two threads are selected at instruction fetch, typically at the front of the pipeline and hardware determines which of the two thread's instructions to fetch. An instruction for each of the threads pass to an out-of-order machine within which the instructions are running concurrently. For example, an arithmetic logic unit (ALU) instruction from thread 1 and a memory instruction from thread 2 can run simultaneously.

Another type of hardware threading is interleaved multi-threading (IMT) which removes all data dependency stalls from the execution pipeline. One thread is relatively independent from other threads so the probability of one instruction in one pipeline stage needing an output from an older instruction in the pipeline is low. IMT is conceptually similar to pre-emptive multi-tasking used in operating systems.

In contrast to CPU multithreading which handle relatively few threads (typically two or four threads), graphics processing units (GPUs) are stream processors for computer graphics hardware and manage hundreds or thousands of threads, thus using much more sophisticated scheduling. When blocking occurs, for example on a cache miss such as from a memory reference, a very large number of threads are blocked. Threads are chosen for execution on massively parallel thread arrays. In a typical arrangement, a processor has approximately 64,000 threads of which only about a thousand execute at one time. Underlying operations during execution include scheduling, addressing cache misses, and the like. Rather than scheduling from a memory pool, GPUs schedule instructions for execution from a very large pool of threads, waiting for memory to become available to run the next thread.

A CPU can be configured for a CPU thread hierarchy which includes a currently running list and a pool of non-running threads enabled to receive information pertinent to computational limits from devices or components such as special-purpose hardware.

Computational Limits

A limit on computation can be imposed according to setting of priority level which is, in turn, based on available resources. One example resource that can be monitored to set limits on computation is the battery. Limits on computation can be imposed based on battery consumption, battery life remaining. Computational limits can be addressed via a framework of setting capabilities, for example specifying a capability to execute on selected processing resources. In an example implementation, the capability can be set up in metadata.

Addressing computational limits can be fairly complex, involving not only information from monitored resources but also user input. For example, a determination by hardware of low battery level and associated limited battery life can be overridden by a user who may request a software application to run in anticipation of being able to soon recharge the battery at a line power source.

Performance Capabilities

A performance capabilities framework can be defined to address handling of a pool of available resources. A thread pool pattern can be configured wherein a number of threads are created to perform a number of tasks which are typically organized in a queue. Usually, the number of tasks is greater than the number of threads. A thread upon completing an associated task will request the next task from the queue until all tasks have completed. The thread can then terminate or become inactive until new tasks are available. The number of threads can be tuned to improve performance, and can be dynamically updated based on the number of waiting tasks. Increasing the size of the thread pool can result in higher resource usage.

A hardware scheduler can respond to any countable or measurable operating condition or parameter, for example electrons, constraints, frequency, cycles, power, voltage, and the like, to control the thread pool and pool of resources. Two highly useful conditions or parameters for monitoring are power and cycles, which are the basis for other measurable phenomena. Monitoring of operating conditions can be performed in hardware or via software call.

Furthermore, software can associate capabilities with particular objects such as libraries.

In an example embodiment, a software model can be configured to use and enforce performance capabilities. In a relatively simple operation, if power is too low, then the software can limit the maximum number of threads or other capabilities. For example, in a cell processor case the number of threads can be limited to less than 1000. Fundamentally, software can disable functionality if sufficient power is unavailable for scheduled operations.

In another example, a sensor or sensors can detect whether battery bias voltage level is recovering too slowly or, similarly, a thermistor can indicate a battery is too hot which may indicate operating at too aggressive a level. A bit or bits can be set indicating the recovery time is too long. The set bit(s) can be used to throttle the maximum thread hopping rate in the case of a CPU with two threads. The bits disallow a thread hop and set an allowable rate of thread hopping; or perhaps allow thread hopping which creates slowing but saves power.

An example of performance capability monitoring and management can be implemented in a CPU with four process threads each having instruction pointers. One of the four threads is selected to execute for next instruction cycle. Various types of information can be monitored to determine which thread to select including recent demand for power, memory, CPU cycles, and the like. For example, a process can be a resource glutton and allocated fewer resources to enable other processes priority. Information is available relating to recent performance, requested performance, and acceptable performance (niceness).

Another option is to use a "NICE" instruction which can be used to adjust the priority level of predetermined instructions, enabling the instructions to be run in the background at a convenient time. For example, if a processor or battery is running too hot, the NICE instruction can reduce the urgency of executing code. In a particular example implementation, the NICE instruction can change a multiplier and step of a decay algorithm.

High and low capabilities can be specified. For example, a particular software routine can sometimes, although rarely, use floating point operations so the capability for such routines can be set low. Operations performed by software can include monitoring, configuring parameters, and the like.

A predictive hint can also be used to allocate resources. For example, a software routine can use a hint a prediction of a significant amount of floating point usage. A HINT instruction can be included in the routine. In another version, at the beginning of a library function, code can be inserted to enable predictive preferential scheduling. The HINT instruction can be part of the library, for example at the beginning, or associated with the library. Code can be inserted in the library, such as at the beginning of a library function requesting particular resources, for example for preferential scheduling. In one example form, a call to a system call can request the operating system to allocate more resources. In another example form, a hint instruction can be sent to hardware to implement the hint and the hardware responds by using the hint in hardware scheduling, such as push, pop, pull, stack, or the like. The hint instruction typically has no direct effect on program execution. The program will run correctly except for changes in performance and battery life.

Predictive hints can also be implemented other than with a hint instruction. Rather than an instruction, the hint may be part of the data structure. For example, X number of bits can relate to expected capabilities to which a process can be entitled such as a vector or a structure. Software can determine information for a performance descriptor, then fills in the data so that metadata of a descriptor determines importance of the performance descriptor.

Accordingly, predictive hints can be implemented in hardware, software, the instruction set architecture, or a combination of configurations. Hardware is typically more constrained than a software implementation. A software library enables the hint to be passed in a linked list of hash trees for passage into hardware, for example as a 128-bit or 256-bit register. Such an implementation can be implemented in an application programming interface (API) but sufficiently simple to be part of hardware. Thus, the API can be designed, then simplified sufficiently to put into hardware.

Capabilities can be used to implement security. Typically, a system has only a few predetermined capabilities. However, a system can be configured in which every memory addressing register is assigned a capability. If the register specifies a capability to access the associated memory location, the location can be accessed. Otherwise, access is prohibited, for example producing a fault or incrementing counter or accumulator which can be noted in an intrusion vector. For any aspect related to security, if a test is failed, the counter is incremented and placed in the intrusion vector.

An instruction can be specified in an instruction set which sets a capability. In various embodiments, the instruction can be implemented in software, hardware, the operating system, or the like. The instruction can operate in association with a capabilities vector. In some embodiments, the instruction can also or otherwise operate in association with a hint vector.

The capabilities vector can be associated with a pointer, an address, and an object. A highly basic capability is a lower bound and an upper bound. Other more complex capabilities can be implemented. In various implementations, the capabilities vector and the entitlement vector can be separate, or can be combined. Merging the capabilities vector and the entitlement vector enables software structuring.

The capabilities vector can be used to enable fine-grained permission. Fine-grained permission facilitates operations of multiple users or entities in a shared memory data base, enabling the multiple users to access storage such as disk and to perform system calls, but limit access to data only to the user who owns the data or is authorized to access the data. Another benefit of fine-grained permissions is an ability to facilitate and improve security while multiplexing software threads onto hardware threads. In an example configuration, 64000 software threads are multiplexed onto only four hardware threads. Only a small portion of the software threads are running at one time with the remaining software threads idle. The software threads alternately run on the hardware threads, then go back to idle to allow other software threads to run.

A classic security hole in a database management is the inability to limit access to data for the different software threads multiplexed onto the hardware threads. A database typically does not allocate a hardware thread to a user. In typical database operation, a request is received and placed on a software thread so that users are multiplexed onto the software threads, an action giving very little protection. Better protection is attained by allocating each user to a separate process, a technique that is prohibitively expensive because the threads are expensive. Multiplexing the users onto software threads leaves a security hole because access to a particular user's data allowed while running the user's software thread on a hardware thread is not removed when the user's software thread is swapped out from the hardware thread. The access permission remains so access remains enabled. The depicted system solves the security hole by using capabilities.

In a non-capabilities system, any of the software threads can access the entire database at any time, including any data that has been placed in shared memory (unless a call out is made through the operating system to enable any of the threads to create I/O, a prohibitively expensive operation). Simple databases only have one peer thread so all threads can access any data. Many typical databases have 64 threads that can access any data in shared memory but only four threads that can access I/O. These systems sometimes have different privilege levels (for example, Intel's rings 0, 1, 2, 3) so specify compatibility. Most code runs in ring 3 and the kernel in ring 0. Rings 1 and 2 are generally not used although several databases have features that can run in ring 1 and ring 2 but are rare and used primarily for benchmarks (a benchmark hack).

In an example implementation that uses capabilities, generally a processor has 16 or 32 registers, some of which are addressing registers. A capability can be loaded to enable access to selected threads. A capability can be loaded to access a particular thread (owned by another user) into hardware thread 0, enabling running as that user. This is one type of context switch—to change the software thread that is executing on hardware thread 0. The capability registers can then be changed, a minor context switch and a change in privilege level. The action does not invalidating translation lookaside buffer (TLBs), but rather moves the permissions out of the TLB. The access control model is also changed. Capabilities can be used in this manner to change operations, guaranteeing only access to data and/or resources for which access is allowed by a permission-granting entity. Capabilities can guarantee a transitive exposure of only the data and/or resources of another user according to granted authorization. The technique is deterministic so that, by inspection, which accesses are possible is known.

Translation Lookaside Buffer TLB.

A translation lookaside buffer (TLB) is a processor cache which can be used by memory management hardware to improve virtual address translation speed. Processors use a TLB to map virtual and physical address spaces. TLB are used widely in hardware which uses virtual memory.

The TLB can be implemented as content-addressable memory (CAM), using a CAM search key which is the virtual address to produce a search result which is a physical address. If the TLB holds the requested address—called a TLB hit, the CAM search quickly yields a match and the retrieved physical address can be used to access memory. If the TLB does not hold the requested address—a TLB miss, the translation proceeds by looking up the page table in a process called a page walk. The page walk is computationally expensive process, involving reading contents of multiple memory locations and using the contents to compute the physical address. After the page walk determines the physical address, the virtual address to physical address mapping is entered into the TLB.

A stream monitoring instruction can improve efficiency and performance of the TLB by supporting a software predictor. The instruction can be used to monitor misaligned or split access. A memory access is aligned when the data item accessed is n-bytes long and the data item address is n-byte aligned. Otherwise, the memory access is misaligned. Monitoring for misaligned access can be performed by hardware, resulting in a trap, or somewhat less efficiently by software. In practice, monitoring for misaligned access has a high false positive rate, for example approaching 90%. A predictor can be configured, for example by microarchitecture adjustment, to indicate whether the misaligned access hits are accurate.

A processor can be configured to change voltage, frequency, and/or power based on the number of cache misses. For example, logic can detect an abundance of cache misses or other performance problems, the voltage can be varied such as increased to cure the problem. The logic can dynamically adjust operating parameters according to the amount of traffic. Frequency and voltage can be adjusted, for example whenever a change in frequency occurs, the voltage can be modified accordingly.

Logic in a memory interface can detect when memory is full to some threshold level, for example 70%. If memory is full to the threshold level and a high level of access is occurring, memory speed can decrease. In response, the frequency and voltage of operation can be dynamically increased to maintain a desired memory speed.

In various embodiments, logic for performing dynamic adjustment can be positioned in memory, in a logic interface, in a processor. A hardware configuration can optimize by active adjustment, redirection, or possibly a combination of adjustment and redirection. For example, a computation-intensive process with many instructions to be executed rapidly can be addressed by running the processor at a higher rate by increasing operating frequency and voltage, and/or some of the burden can be shifted to components other than the processor to maintain processor execution at a lower frequency.

Infrastructure.

An infrastructure configured to support multiple processors in a system can have a shared memory and message passing between threads, processes, processors, and the like. Operating systems (OS) can include various mechanisms to enable message passing, for example pipelines, daemons that use sockets, loopback, and the like. Any suitable number of processors can be supported in the system, from relatively small systems with few processors to large scale systems with hundreds of thousands or millions of processors. In a typical large scale system, the multitudes of processors communicate via fat trees which support the large amount of bandwidth demanded by the large scale system. The amount of bandwidth in different positions in the tree is variable, depending on traffic. In various other configurations, the many processors can communicate via meshes or buses, via Gigabit Ethernet, via CDMA-CE (Code Division Multiple Access-series CE), and the like. In large interconnects, the number of processors determines what functionality is attainable. For example, for more than about 1000 processors, memory can no longer be shared. At around 100 processors, memory space can be shared but cache-coherence is typically not possible and memory is thus non-cache-coherent shared memory. Cache-coherence is generally considered to cause problems for more than about sixteen processors so that fewer processors at a first level can have cache-coherent shared memory.

For a supercomputer or other system with the large number of processors, for example more than about 1000, for which memory is non-shared, Message Passing Interface (MPI) can be used for communication. MPI uses multiple threads but does not use shared memory. The MPI multiple threads are all part of local shared memory, but no global shared memory exists. The amount of local shared memory is limited, resulting in a communications bottleneck. Supercomputer memories use Message Passing Interface (MPI) which, to a first order, includes a limited number of instructions such as send some location, buffer, end buffer, and receive some entity, buffer, end buffer, and the like. MPI is an application programming interface (API) and is thus a library call. The received entity can be, for example, a channel connecting the sender and the receiver, although channels are rarely used in MPI since channels do not scale beyond about a thousand processors. Accordingly, MPI can use commands with masks which identify which processors are to receive a message. A difficulty with MPI is that different code must be written, and a different core engine and interface, for small-scale and large-scale parallelism. Thus, send-and-receive communication such as is used by MPI is suitable if memory is shared.

What is desired is a technique for expanding send-and-receive communication more broadly. In accordance with system and method embodiments, a communications application programming interface (API) can be created that enables communication between different types of threads and hides that the threads are sharing memory. The communications API can enhance functionality of a Transmission Control Protocol (TCP) socket. The TCP socket, also termed an Internet socket for network socket, is an endpoint of a bidirectional inter-process communication flow across and Internet Protocol (IP)-based computer network such as the Internet. In some embodiments, the communications API can also incorporate functionality of MPI into that of a TCP socket. In a distributed system, a processor can communicate with a Network Interface Controller (NIC) and a send instruction puts data on a queue to send to the NIC and pass through the routing network to a specified destination. The communications API can perform communications via TCP-IP, in some configurations optimizing aspects of TCP-IP such as by ordering packets, and also via other protocols. The communications API can include send-and-receive functionality, and include one or more channels, which is operable with TCP-IP. Some of the channels can be shared memory in the form of a buffer with a counter. Some channels can connect to the NIC, some channels to TCP-IP, and some channels can have other functionality. In some embodiments, the communications API can support different types of channels. One example of a channel type is simply registers. Another type of channel can run two hardware threads with a pipeline coupled between the two threads.

The communications API can be adapted to handle the possibility of overflow. For example, for a channel implemented as shared registers, filling the registers to capacity can cause overflow to memory, which can call a trap or exception.

Another technique for expanding send-and-receive communication more broadly can comprise creating a message passing infrastructure in hardware. Speed is one advantage of forming the message passing infrastructure in hardware. For example in the case of a system call, conventionally a slow operation, hardware can be configured to support a send instruction operable to check a bit in a channel selected for the send operation to determine whether the channel is available and, if not, performing a system call by faulting to the system call. Thus, the hardware can be configured to pass execution through the operating system in response to desired conditions.

In an example embodiment, the message passing infrastructure hardware can be configured to avoid passing execution through the operating system, for example to avoid the context switch inherent with going to the operating system. In another example embodiment, the hardware can be configured to include a message passing paradigm and one core can be run in ring 0 to enable access to operating system calls. The operating system is not a separate process but rather a library call in a library. Another option is to allocate a hardware thread to the operating system.

The operating system performs a ring 0 call via a system call which, in terms of hardware implementation, can be a function call to change a bit, granting permission to change the bit, and identification of the stack from which the OS is operating. In one example implementation, the user can explicitly control the stack, for example by placing the operating system stack in a different register. In another implementation, a system call can change the instruction pointer and the stack.

The message passing infrastructure hardware implementation can, for example, include support for send and receive calls. The hardware implementation can enable faster operating speed. For particular special cases, hardware send and receive calls can be faster than a shared library call. Send and receive are global messages, supporting point-to-point communication in two-party messaging. In some embodiments, the hardware implementation can support put and get APIs to enable sending a message to a designated address asynchronously or synchronously, as selected. The designated address is in a global address space partition, not local load-store. The put and get APIs can handle access to shared physical memory by sending a request to the master or server for the designated memory location. The memory is hashed across all the global memory space. In the illustrative implementation, get and put can be system calls rather than instructions, thus facilitating global access. Because the get and put system calls are relatively resource-expensive, efficiency can be attained by communicating blocks of data, for example 64K, at one time rather than for individual bytes.

For a cache-coherent shared memory that is accessed using the put and get system calls, different schemes can be used depending on what entities are communicating. For entities which share memory, the get and put calls simply access the shared memory. For entities separated by substantial physical or network distances, the get and put calls, if unable to fulfill the call by shared memory access, by running through the same router or similar local actions can send the calls to the network interface to relay remotely, for example across the world. For shared memory, whether cache-coherent or cache-noncoherent, the put and get, and send and receive operations are relatively simple since all entities can access the same memory. More complexity arises when memory is not shared. In various embodiments, when memory is not shared different schemes can be used such as copy-on-write (copying the shared memory), creating in remote memory the shared memory that shares the same capability, an implicit in the put and get, or other options.

The message passing infrastructure thus can include hardware support for the various put and get, send and receive, or the like system calls or instructions. The message passing infrastructure can be configured to enable two threads to be forked and used with the put and get calls to enable optimum speed performance. The send and receive, and put and get instructions, as described, consume two hardware threads or might consume two passive threads.

In some embodiments, the put-get and send-receive can be combined with access bits which designate memory to which the sender is allowed access. Passing along the access bits can enable a reduction in overhead while enabling protection across processes. The overhead of switching or sending a message drops significantly because the receiver already knows the memory to which the sender has access.

An entitlement vector can be used to simultaneously manage and activate entitlement of objects and processes to various resources independently from one another. The entitlement vector can be specific to particular objects, processes, libraries, and the like and can specify entitlement, activation levels, power levels, application timers, and other aspects of operation. The entitlement vectors operate on a resource pool and enable detection and resolution of conflicts when physical resources are insufficient to address all resource requests. Accordingly, the entitlement vectors can be used to allocate resources to a selected priority and schedule later usage of resources to deferred objects and processes. Referring to FIGS. 1A, 1B, 1C, 1D, and 1E, four schematic block diagrams and a data structure diagram respectively show embodiments of an information handling apparatus 100 adapted to facilitate resource allocation using an entitlement vector 104 comprising multiple fields that are respectively directed to multiple different resources 108 or capabilities 144. In an illustrative embodiments, an information handling apparatus 100 can comprise an entitlement vector 104 configured with a plurality of bit fields 105 at least partly corresponding to a plurality of resources 108. The bit fields 105 are operable to specify the resources 108 used by at least one object 102 of a plurality of a plurality of objects 102. The information handling apparatus 100 can further comprise logic 106 operable to allocate the resources 108 to the at least one object 102 based on entitlement 107 as specified by the entitlement vector 104.

In some implementations, entitlement 107 can be set according to a predetermined algorithm which defines a "fair share" for the processes, for example round-robin, history-based, randomized, and the like, which are efficient since a large history need not be accumulated. Thus, an efficient and inexpensive hardware implementation is possible. A particular scheme can allocate modulo by bit to avoid starving a process with lower entitlement 107.

Figure 1B:
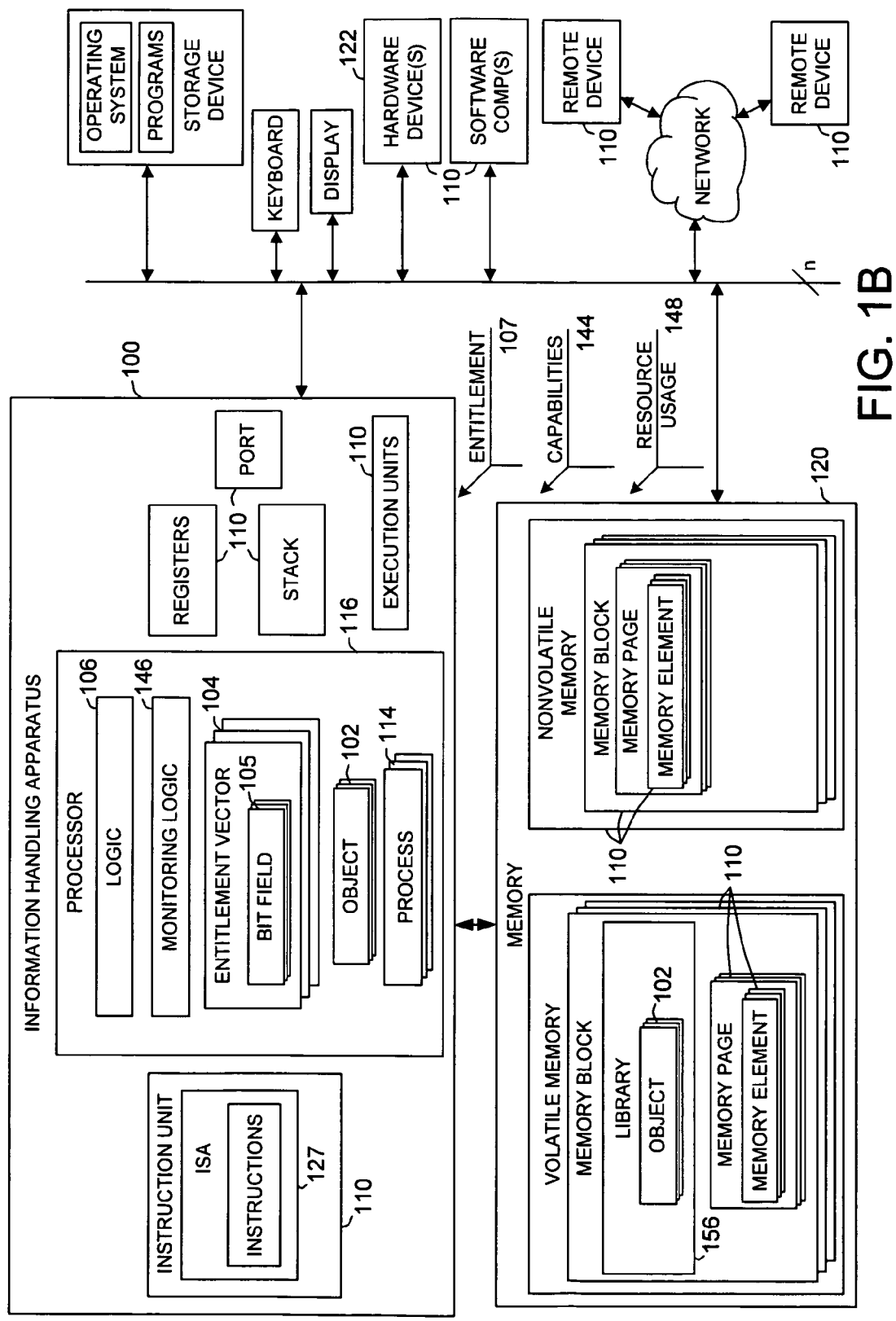
Figure 1C:
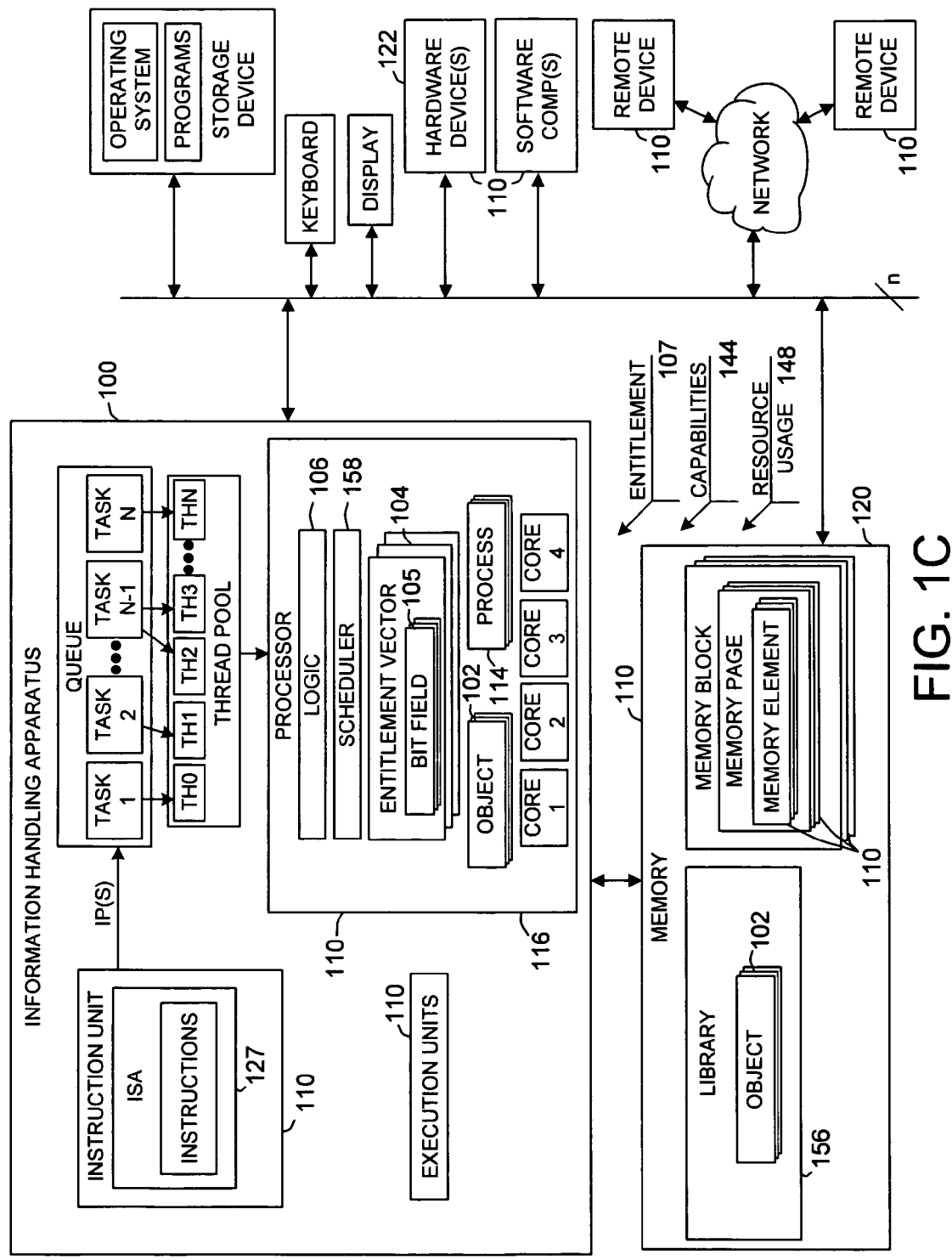
Figure 1D:
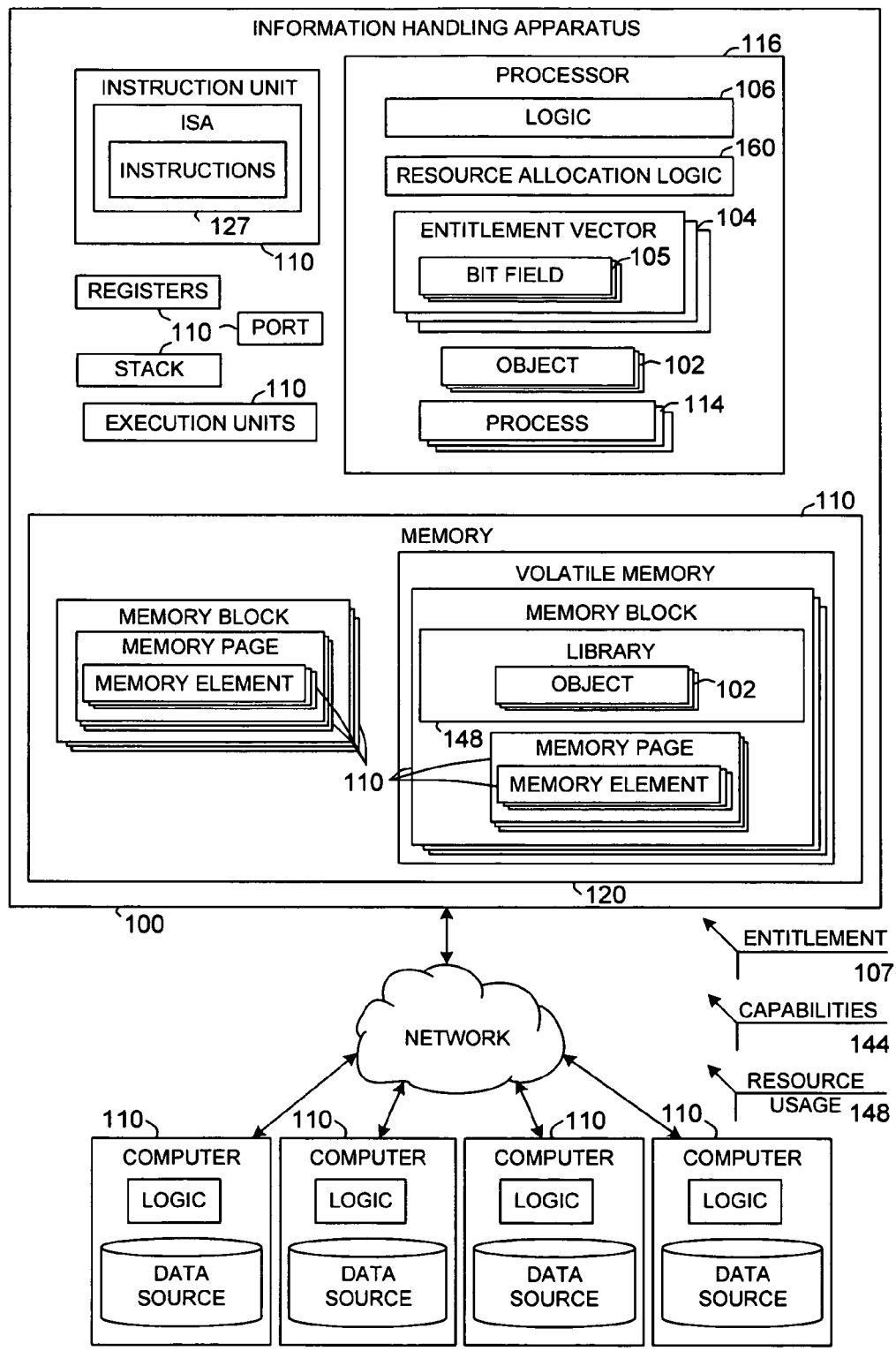
Figure 1E:
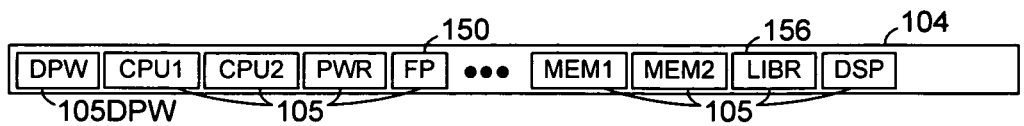
FIG. 1E is a data structure diagram respectively showing embodiments of an information handling apparatus adapted to facilitate resource allocation using an entitlement vector comprising multiple fields that are respectively directed to multiple different resources or capabilities.
Figure 1E:
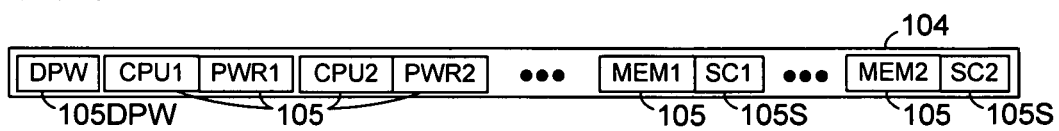
Figure 1E:
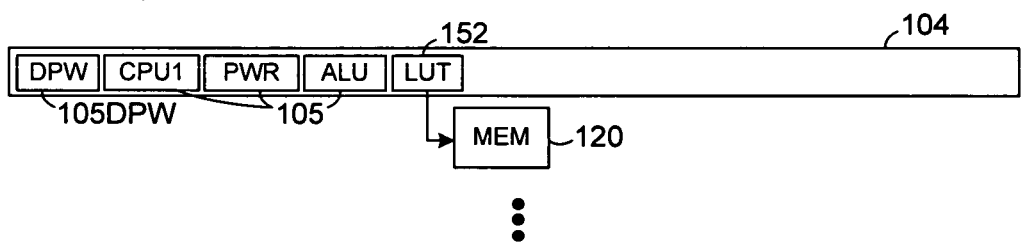
Figure 1E:
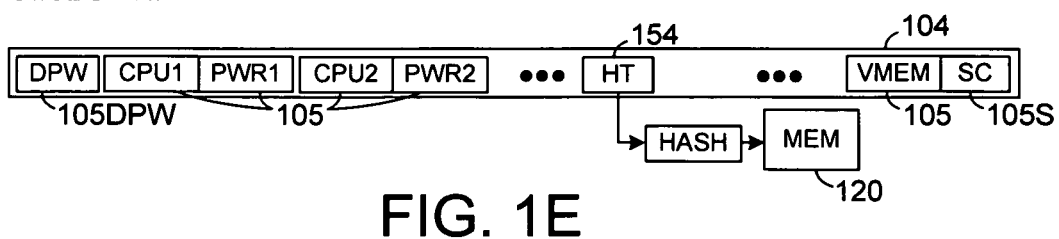

In various embodiments of the information handling apparatus 100, the entitlement vector 104 can comprise a plurality of bit fields 105 respectively directed to a plurality of different resources 108 and capabilities 144, for example as shown in FIG. 1E. The entitlement vector 104 can be operable to specify the resources 108 and capabilities 144 used by the at least one object 102.

Resource allocation can be handled via various architectural aspects of a system including microarchitecture, instruction set architecture (ISA), operating system, and library calls. Software can associate capabilities with particular library functions or software objects. This software can be in the form of compiler, operating system, or others. The operating system can, for example, create a profile for any process running floating point operations and give that entitlement. Resources allocated include processors, central processing units (CPUs), graphics hardware, network controllers, memory, memory management, other hardware, and the like. Resources further include power, cycles, and the like. Thus, in various embodiments of the information handling apparatus 100, the plurality of resources 108 can comprise physical/logical resources 110 and operational resources 112.

The physical/logical resources 110 of a particular information handling apparatus 100 can be one or more of physical and/or logical instances of processors 116, central processing units (CPUs) 117, graphics hardware 118, network controllers 119, memory 120, memory management 121, hardware 122, microarchitecture 123, sound cards 124, video cards 125, network interfaces 126, instruction set architecture (ISA) 127, library calls 128, library functions 129, software objects 130, compilers 131, operating systems 132, and the like.

Resources can be allocated in response to any countable or measurable operating condition or parameter, for example electrons, constraints, frequency, cycles, power, voltage, and the like, to control the thread pool and pool of resources. Two highly useful conditions or parameters for monitoring are power and cycles, which are the basis for other measurable phenomena. Monitoring of operating conditions can be performed in hardware or via software call. Thus, in various embodiments and/or applications of the information handling apparatus 100, the operational resources 112 can be one or more entities or phenomena including, for example, power 133, voltage 134, current 135, electrons 136, frequency 137, execution cycles 138, battery consumption 139, battery life 140, constraints 141, temperature 142, and measurable phenomena 143, and the like.

Power is typically global to a process or to an individual CPU. Use of capabilities enables more refined control of power, for example power can be made specific to an object or library routine. With power global to a process, the process will continue to run in absence of a fault, a page fault, a disk access, or the like, and will run until blocked by the operating system scheduler, allowing high power consumption. Use of capabilities enables power to be controlled on a per-hardware thread granularity. Use of capabilities further enables power to be controlled specific to a per-hardware thread granularity for throttling power. Accordingly, the information handling apparatus 100 can be constituted wherein the entitlement vector 104 is operable to ascertain and specify resources 108 and capabilities 144 used by the at least one object 102.

In various embodiments, the information handling apparatus 100 can be configured such that the logic 106 operable to allocate the resources 108 to the at least one object 102 is operable to ascertain resources 108 and/or capabilities 144 used by an object 102 of the plurality of objects 102 and further operable to set the entitlement vector 104 according to the ascertained resources 108 and/or capabilities 144.

Communication and computational data path widths can be selected of a suitable size to accommodate data-intensive activities. A data path width entitlement vector field may request a reduction to a maximum available data path width, or selected to use only a portion of a maximum available data path width. For example, perhaps only 128 bits of 1024 bits are used. The other bits of the non-used data path width may be shared with another process or shut down to conserve energy. For example, a portion of a power-hungry super accumulator may be powered down in response to a data path width indication in a field of an entitlement vector 104. Thus, the information handling apparatus 100 can be configured wherein the bit fields 105 of the entitlement vector 104 can include a data path width bit field 105DPW operable to request allocation of only a portion of a maximum data path width.

For example, for a total width of 1024 bits, a particular application or operation can be found to function suitably with only 128 bits. Thus, resource conservation is possible by operating upon only a predetermined subset of the bits, reducing the data path width from the total available width, for example as shown with respect to Object 3 in FIG. 1E. Hence, in various embodiments and/or applications of the information handling apparatus 100, the bit fields 105 of the entitlement vector 104 can comprise a data path width bit field 105DPW operable to request allocation of only a portion of a maximum data path width wherein a plurality of processes 114 share the entitlement vector 104.

The concept of operation of data path width in an illustrative entitlement vector 104 can have to some similarities to that of scale. For example, an instruction that is 1024 bits may be so large that power is wasted. Thus, in conditions such that an identification can be made that only a portion of the bits are required for a particular operation or circumstances, a selected subset of the bits can be activated. When only a portion of the bits are activated, the result of operations does not change, and resources such as power are conserved. Thus a scaling concept can have similarities to the concept of selected partial data path width. The data path width can thus be part of the entitlement. Thus, embodiments of the information handling apparatus 100 can be configured wherein the bit fields 105 of the entitlement vector 104 comprise a data path width bit field 105DPW operable to request allocation of only a portion of a maximum data path width wherein a portion of the entitlement vector 104 is deactivated to conserve energy.

Libraries or other objects (and associated threads) can request entitlements. Objects use resources to execute. For example, a networking library has greater usage of a network resource than other libraries or objects. Particular entitlements may be assigned to individual library routines using an entitlement vector, which can indicate expected capabilities to which an object may be entitled. Entitlements may be assigned via the entitlement vector. An entitlement vector may be used when selecting a thread for execution in a multi-threading environment in terms of aspects such as priority. Accordingly, embodiments and/or applications of the information handling apparatus 100, for example as shown in FIG. 1B, can further comprise monitoring logic 146 operable to monitor resource usage 148 and associate a library call 128 as at least a portion of the bit fields 105 based on the monitoring.

The entitlement vector 104 can track and/or control usage of any suitable resources 108 and capabilities 144. General examples can include usage of power, arithmetic logic unit (ALU), virtual memory, translation lookaside buffer (TLB), graphics triangle computations, floating point, and the like. Software and/or hardware may determine values for each of these fields, for example after monitoring, or the values can be preconfigured. Accordingly, some embodiments of the information handling apparatus 100 can further comprise monitoring logic 146 which is operable to monitor resource usage 148 and determine values for the bit fields 105 based on the monitoring.

Human perception is limited. For data representing phenomena that are to be perceived by humans, the data size can be limited so that precision beyond what is human-perceptible may be omitted, enabling resource conservation. Accordingly, a requested data resource can be scaled down or a maximum size set. For example, finger prints do not require greater than 2 MB, and human vision can discern only "x" amount of resolution. Scale may also be applied to other parameters having a relevant precision that is constrained by the physical world. Thus some embodiments of the information handling apparatus 100 can comprise monitoring logic 146 that is operable to monitor resource usage 148, scale data according to human-perceptible precision, and set values for the bit fields 105 based on the monitoring and scaling.

As shown with respect to Object 2 of FIG. 1E, the bit fields 105 can include a scale bit field 105S, adding the feature or capability of scaling data. Examples of scale can include human scale, width of accumulator, measurement-precision scale, perceivable scale, and the like. For commonly-stored data such as biometric or finger print scale, more than 2 MB is virtually never needed. Therefore, in various embodiments and/or applications of the information handling apparatus 100 can comprise monitoring logic 146 operable to monitor resource usage 148, scale data according to physical precision, and set values for the bit fields 105 based on the monitoring and scaling.

Similarly, in some embodiments of the information handling apparatus 100, the bit fields 105 of the entitlement vector 104 can comprise a scale bit field 105S operable to specify a scale of at least one of the bit fields 105.

The multiple fields of the entitlement vector 104 can be set as determined by monitoring of resource usage 148. Logic in software and/or hardware can track system operations over history or, in some embodiments, can be preprogrammed, and fill in some sets in the fields accordingly. The resource usage 148 can be analyzed to select appropriate values for the fields. Consequently, the information handling apparatus 100 can be configured which further comprises monitoring logic 146 operable to monitor resource usage 148, determine values for selected ones of the bit fields 105 based on the monitoring, and set the selected ones of the bit fields 105.

In various embodiments, applications, and/or conditions, the monitoring logic 146 can determine appropriate values for the monitored phenomenon and set a field of the entitlement vector 104 in an appropriate form. Suitable forms can include a bit of data, several bits of a size appropriate for information of usage. In some applications, the bit field can be associated as a lookup table, an associated hash table, or an extra field in which a library can be called. The bit field size and format can be determined based on considerations of implementation, for example whether the logic is configured in hardware or software. Accordingly, some embodiments of the information handling apparatus 100 can further comprise monitoring logic 146 operable to monitor resource usage 148, and determine a value of a single bit 150 of the bit fields 105 based on the monitoring, as shown for Object 1 of FIG. 1E.

Similarly, various embodiments of the information handling apparatus 100 can comprise monitoring logic 146 operable to monitor resource usage 148 and associate a lookup table 152 as at least a portion of the bit fields 105 based on the monitoring, as depicted for Object 3 of FIG. 1E.

Also, some embodiments and/or applications of the information handling apparatus 100 can further comprise monitoring logic 146 operable to monitor resource usage 148 and associate a hash table 154 as at least a portion of the bit fields 105 based on the monitoring, as depicted for Object N of FIG. 1E.

An entitlement vector 104 that is suitable for storage in hardware 122 is configured in a suitable size, for example 256 bits in some systems and architectures, although any suitable size can be implemented. Very large width entitlement vectors, for example 64K bits, can be too unwieldy for hardware implementation. In various embodiments, values can be Boolean, a number from a numerical range to indicate how much from a percentage or relative sense of a given resource is being requested, and others. For example, a large number can be placed in an ALU field if significant usage of the ALU is expected. Accordingly, in various embodiments of the information handling apparatus 100, the bit fields can include data types such as integer, floating point, Boolean, characters, strings, numerical values, numerical values indicative of relative resource allocation, complex numbers, tables, library calls, and any other suitable form.

In some applications, when a library call 128 is made, entitlement vector 104 is returned. Hence, various embodiments and/or applications of the information handling apparatus 100 can further comprise monitoring logic 146 operable to monitor resource usage 148 and determine values for the bit fields 105 based on the monitoring, wherein a library call 128 returns the entitlement vector 104.

The entitlement vector 104 can be supplied from various sources, either internal or external to the information handling apparatus 100. For example, the entitlement vector 104 can be installed into hardware 122 as side effect of library call 128. Thus, some embodiments of the information handling apparatus 100 can further comprise monitoring logic 146 which is operable to monitor resource usage 148, determine values for the bit fields 105 based on the monitoring, and install the entitlement vector 104 into hardware 122 as a side effect of a library call 128.

In some embodiments and/or applications, the information handling apparatus 100 can be configured to further comprise a library 156 wherein the entitlement vector 104 specifies and/or allocates resources 108 and/or capabilities 144 used by at least one object 102 in the library 156.

The information handling apparatus 100 can be configured to support prioritized entitlements and resource allocations upon calling selected libraries. A typical embodiment includes such support in software, although hardware support can also be implemented. For example, a network library can include library routines adapted for heavy network usage so that resources giving access to the network are more important processes to schedule. More entitlements are allocated to network-related resources. Libraries can also be configured to handle secondary priorities that change dynamically. For example, a sound card can have a greater power priority and have a pattern of operation wherein a process uses a network card and possibly other subsystems in combination with the sound card. Thus, the network card and other subsystems can also be allocated a higher priority. Similarly, for a process which performs less modeling and number computation in lieu of higher input/output operations and sending of information, a higher level of priority can be allocated to input/output resources.

A library is a collection of resources used to develop software, including pre-written code and subroutines, classes, values, or type specifications. Libraries contain code and data to enable services to independent programs, encouraging code sharing, modification, and distribution. Executables can be both standalone programs and libraries, although many libraries are not executable. Executables and libraries make references known as links to each other through the process known as linking, for example by using a linker.

Referring to FIG. 1C, a scheduler or chooser can monitor entitlement values and schedule the next highest priority process. A particular scheme can allocate modulo by bit to avoid starving a process with lower entitlement. In some conditions, the level of entitlement can be overridden or adjusted. Entitlement can be set according to a predetermined algorithm which defines a "fair share" for the processes, for example round-robin, history-based, randomized, and the like, which are efficient since a large history need not be accumulated. Thus, an efficient and inexpensive hardware implementation is possible.

A field of the entitlement vector can be a chooser/thread selector. The entitlement vector can be used by the chooser/scheduler, which includes logic that performs operations based on a single entitlement vector or possibly relative entitlement vectors. Each Instruction Pointer (IP) or thread can have an associated entitlement vector. For example instruction pointers, for IP1, IP2, IP3, IP4, then four entitlement vectors can be allocated. Chooser/scheduler logic considers the entitlement vector when scheduling the next thread for computation. The logic informs the chooser/scheduler about how to make the selection. The logic can perform selected functions to make the choice and for scheduling, for example by elevating or decreasing priority of a thread.

Accordingly, in some embodiments the information handling apparatus 100 can further comprise a scheduler 158 operable to schedule a process of a plurality of processes 114 based on at least one entitlement vector 104 of a plurality of entitlement vectors 104.

The scheduler 158 can operate as a chooser or thread selector. The entitlement vector 104 can be used by a chooser which has logic that performs operations based on relative entitlement vectors 104, or even a single entitlement vector 104.

In a particular implementation, individual instruction pointers or threads can have an associated entitlement vector 104. For example, in a particular embodiment, each instruction pointer can be allocated a respective entitlement vector 104 so that instruction pointers IP1, IP2, IP3, and IP4 would use four entitlement vectors 104.

The scheduler 158 can include or operate in combination with logic that considers the entitlement vector 104 when scheduling the next thread for computation. The logic informs the chooser about how to select threads. For example, the entitlement vector 104 can be used during choosing by elevating or reducing priority of a particular thread. In a particular illustrative simple operation, logic can compute the sum of weight times the entitlement vector EV, which can be compared to a usage vector of Thread. The evaluation enables scheduling of highest or lowest priority for threads. A thread that is high priority and has a large resource usage is likely to be scheduled. However, a thread with low priority and very large resource usage is likely to be deferred for execution. A thread with high priority and only little resource usage is likely to be moved toward the front of an execution queue. The entitlement vector 104 can thus be used to avoid threads which are gluttons for resources. The evaluation need not be linear and can use a nonlinear evaluation function ($F_i(w_i, EV_i, v_i)$). The entitlement vector 104 thus enables association of scheduling with resource usage and dynamic functions and operation.

Accordingly, in various embodiments, the information handling apparatus 100 can further comprise a scheduler 158 operable to schedule a process 114 of a plurality of processes 114 based on the entitlement vector 104 wherein the entitlement vector 104 specifies that the process 114 of the plurality of processes 114 is entitled to a predetermined percentage of operational resources 112.

Logic, such as in hardware or software, or a manual determination, can ascertain and/or specify what resources/capabilities are to be used by an object. In various embodiments, the entitlement vector 104 can be dynamically determined and modified. Referring to FIG. 1D, some embodiments of the information handling apparatus 100 can further comprise resource allocation logic 160 operable to dynamically modify the entitlement vector 104 according to usage of resources 108 by the at least one object 102 of a plurality of a plurality of objects 102.

A performance capabilities framework can be defined to address handling of a pool of available resources. A thread pool pattern can be configured wherein a number of threads are created to perform a number of tasks which are typically organized in a queue. Usually, the number of tasks is greater than the number of threads. A thread upon completing an associated task will request the next task from the queue until all tasks have completed. The thread can then terminate or become inactive until new tasks are available. The number of threads can be tuned to improve performance, and can be dynamically updated based on the number of waiting tasks. Increasing the size of the thread pool can result in higher resource usage.

A limit on computation can be imposed according to setting of priority level which is, in turn, based on available resources. One example resource that can be monitored to set limits on computation is the battery. Limits on computation can be imposed based on battery consumption, battery life remaining. Computational limits can be addressed via a framework of setting capabilities, for example specifying a capability to execute on selected processing resources. In an example implementation, the capability can be set up in metadata.

A sensor or sensors can detect whether battery bias voltage level is recovering too slowly or, similarly, a thermistor can indicate a battery is too hot which may indicate operating at too aggressive a level. A bit or bits can be set indicating the recovery time is too long. The set bit(s) can be used to throttle the maximum thread hopping rate in the case of a CPU with two threads. The bits disallow a thread hop and set an allowable rate of thread hopping; or perhaps allow thread hopping which creates slowing but saves power.

Figure 2A:
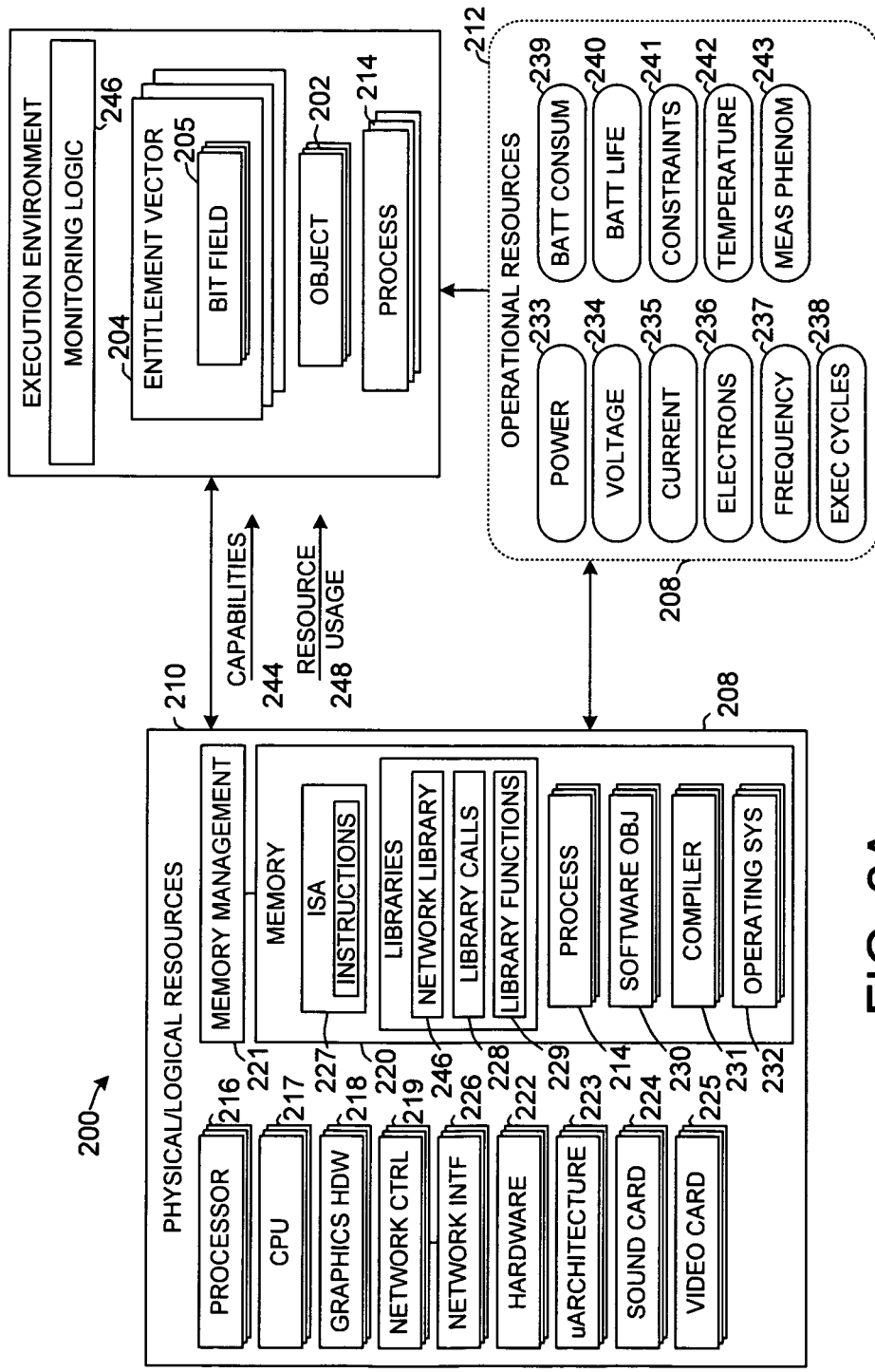
FIGS. 2A, 2B, and 2C are two schematic block diagrams and a data structure diagram respectively illustrating an embodiment or embodiments of an information handling apparatus that enables dynamic modification of the entitlement vectors.

The entitlement vector can be used to enable dynamic runtime updating of an entitlement vector. The entitlement vector can be used to track resource usage by an object or process. Through updating of the entitlement vector and application of the entitlement vector to instruction execution, dynamic updates are applied to instructions. In some embodiments and in some conditions, for example defining an initial state, the entitlement vector can be initially set, for example as supplied by a user or set to a default condition. Similarly, the entitlement vector can be set by specification of the beginning and the end of the function, for example to determine the final condition. The entitlement vector can also be dynamically derived or monitored through performance monitoring, such as monitoring of resource usage and determining the entitlement vector used by active objects and functions, and dynamic control of other entitlement vectors that may not be directed related to the active objects and functions. Accordingly, referring to FIGS. 2A, 2B, and 2C, two schematic block diagrams and a data structure diagram respectively illustrate an embodiment or embodiments of an information handling apparatus 200 that enables dynamic modification of the entitlement vectors 204. Accordingly, in an illustrative embodiment, an information handling apparatus 200 can comprise an entitlement vector 204 configured with a plurality of bit fields 205 at least partly corresponding to a plurality of resources 208. The entitlement vector 204 can be operable to specify the resources 208 used by at least one object 202 of a plurality of a plurality of objects 202. The information handling apparatus 200 can further comprise monitoring logic 246 operable to monitor resource usage 248 and determine values for the bit fields 205 based on the monitoring.

The entitlement vector 204 can also be modified by a capability process. For example, a user or various operations of the information handling apparatus 200 can allocate usage of resources 208 in a predetermined manner but operating systems 232 can limit the allocation, or can weigh the allocation and set resources 208 to an allowed maximum. Hence, the information handling apparatus 200 can be configured such that the entitlement vector 204 comprises a plurality of bit fields 205 respectively directed to a plurality of different resources 208 and capabilities 244. The entitlement vector 204 can be operable to specify the resources 208 and capabilities 244 used by the at least one object 202.

The entitlement vector 204 can be configured to conserve resources by recognizing limits to human perception of particular phenomena. Thus, the information handling apparatus 200 can be constituted such that the monitoring logic 246 is operable to monitor resource usage 248, scale data according to human-perceptible precision, and set values for the bit fields 205 based on the monitoring and scaling.

Similarly, the entitlement vector 204 can consider physical constraints to information and thus conserve resources. Accordingly, the information handling apparatus 200 can be formed such that the monitoring logic 246 is operable to monitor resource usage 248, scale data according to physical precision, and set values for the bit fields 205 based on the monitoring and scaling.

Logic can monitor a system over history and fill in various bit fields 205 of the entitlement vector 204 by analyzing resource usage 248 and determining suitable values for the bit fields 205, for example as a bit of data, associated as a lookup table, associated as a hash table, an extra field which can be used to call for a library, or other suitable techniques. Hence, the information handling apparatus 200 can be configured wherein the monitoring logic 246 is operable to monitor resource usage 248, determine values for selected ones of the bit fields 205 based on the monitoring, and set the selected ones of the bit fields 205. For example, as shown for Objects 3 and 4 in FIG. 2C, the bit fields 205 of the entitlement vector 204 can comprise a data path width bit field 205DPW operable to request allocation of only a portion of a maximum data path width wherein a plurality of processes 214 share the entitlement vector 204.

Figure 2B:
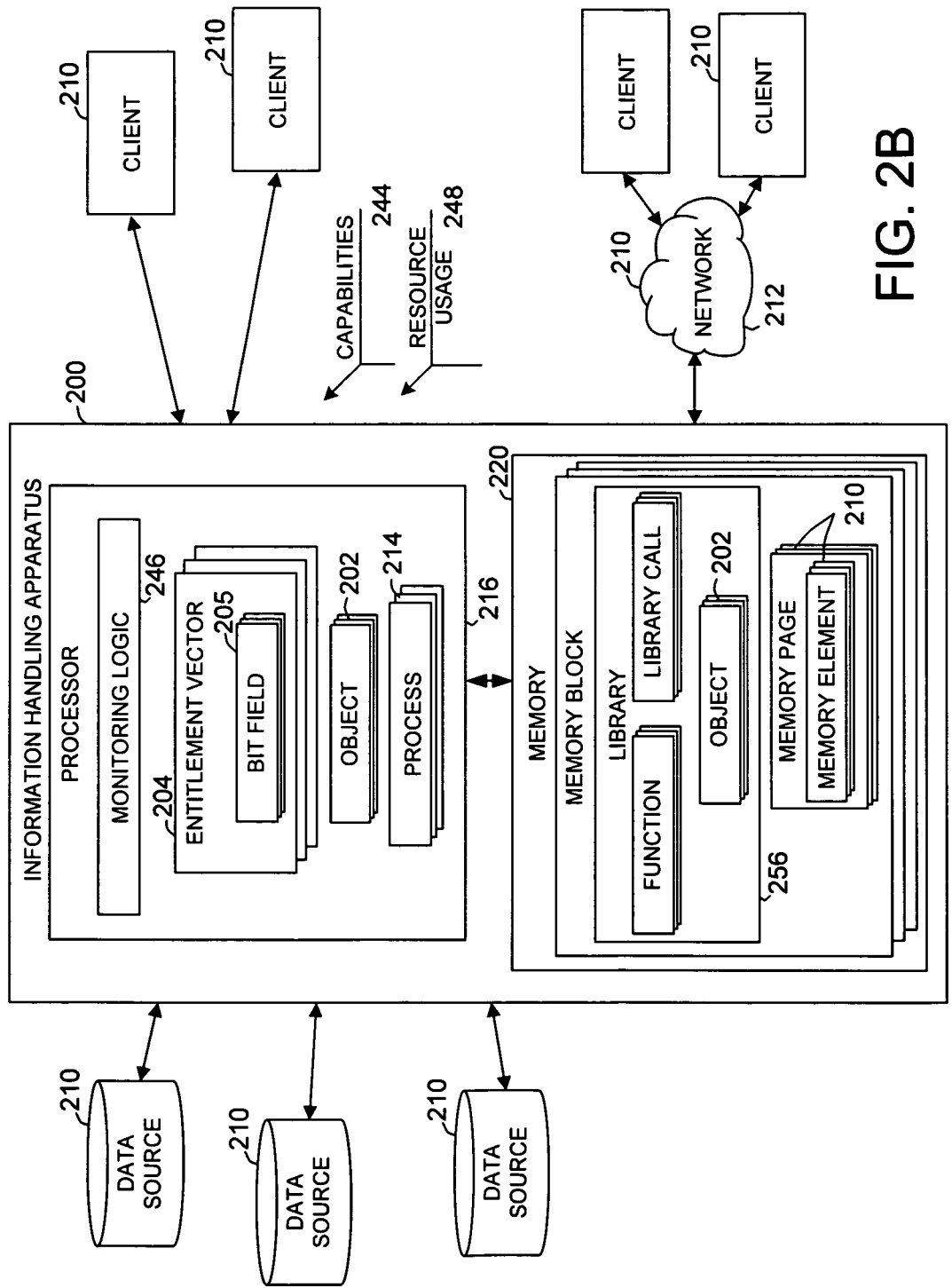
Figure 2C:
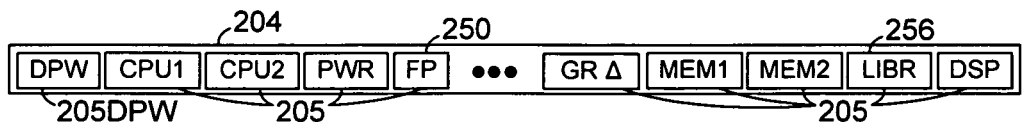
Figure 2C:
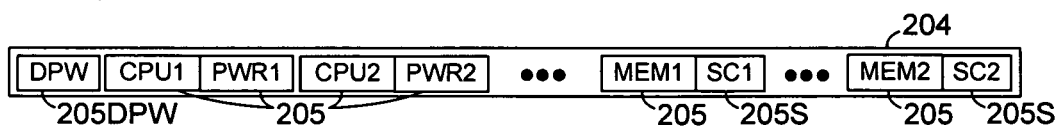
Figure 2C:
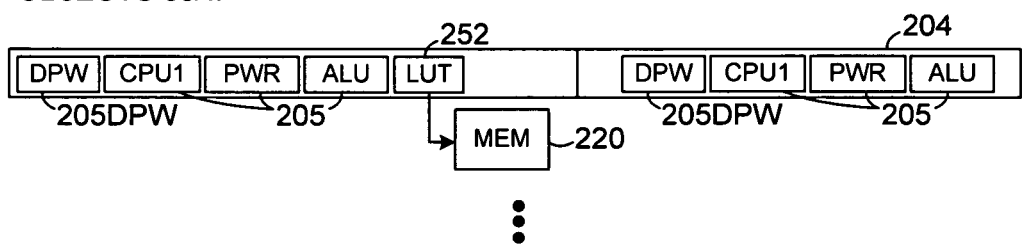
Figure 2C:
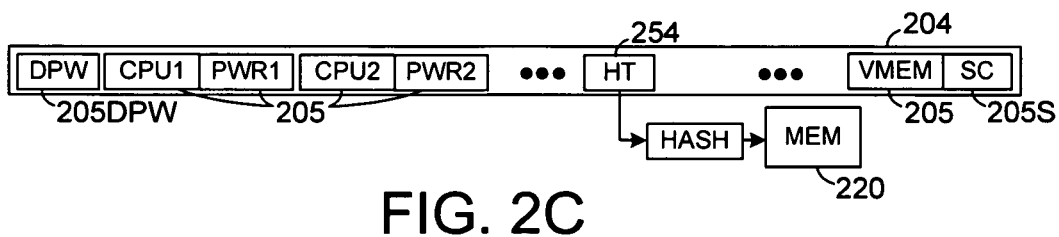

As shown with respect to Object 2 of FIG. 2C, the bit fields 205 can include a scale bit field 205S, adding the feature or capability of scaling data. For example, the scale bit field 205S can be asserted to indicate entitlement of an object to floating point hardware, while a deasserted bit indicates that floating point is not used and power to hardware can be denied.

For some resources 208, under certain conditions, and for particular phenomena, a single bit is suitable for setting entitlement, for example to specify that entitlement is enabled or disabled. Thus, the information handling apparatus 200 can be configured wherein the monitoring logic 246 is operable to monitor resource usage 248 and determine a value of a single bit 250 of the bit fields 205 based on the monitoring.

Additional complexity is enabled by using a field in the form of a table. Consequently, the information handling apparatus 200 can be formed such that the monitoring logic 246 is operable to monitor resource usage 248 and associate a lookup table 252 as at least a portion of the bit fields 205 based on the monitoring.

In some embodiments and/or applications, a hash table can be used to allocate entitlement. For example, the hash table can indicate a level of entitlement per memory block. The hash enables reduction of bits in the table such as by using memory at the hash of an address to compress the address. Accordingly, the information handling apparatus 200 can be formed wherein the monitoring logic 246 is operable to monitor resource usage 248 and associate a hash table 254 as at least a portion of the bit fields 205 based on the monitoring.

Libraries can also be configured to handle secondary priorities that change dynamically. For example, a sound card can have a greater power priority and have a pattern of operation wherein a process uses a network card and possibly other subsystems in combination with the sound card. Thus, the network card and other subsystems can also be allocated a higher priority. Similarly, for a process which performs less modeling and number computation in lieu of higher input/ output operations and sending of information, a higher level of priority can be allocated to input/output resources. Accordingly, as depicted in FIG. 2B, an embodiment of the information handling apparatus 200 can further comprise monitoring logic 246 operable to monitor resource usage 248 and associate a library call 228 of a library 256 as at least a portion of the bit fields 205 based on the monitoring.

In some embodiments and/or conditions, the entitlement vector 204 can be received via a library call 228. The library call 228 is useful, for example, to address a context switch. If some context switches occurs or is likely to occur, that often can lead to strange behavior, the library call 228 can be used to determine the context switch. The library call 228 can also be used to randomize priority. If degradation results from making the library call 228, then if performance starts to decrease, then priority can be temporarily randomized, such as via a Boltzman search, simulated annealing, or hop around. Randomization thus allows determination of a local maximum performance. Thus, an embodiment of the information handling apparatus 200 can be configured wherein the monitoring logic 246 is operable to monitor resource usage 248 and determine values for the bit fields 205 based on the monitoring. A library call 228 can return the entitlement vector 204.

Similarly, the information handling apparatus 200 can be formed such that the monitoring logic 246 is operable to monitor resource usage 248, determine values for the bit fields 205 based on the monitoring, and installs the entitlement vector 204 into hardware 222 as a side effect of a library call 228.

In various embodiments of the information handling apparatus 200, the plurality of resources 208 can comprise physical/logical resources 210 and operational resources 212. The physical/logical resources 210 of a particular information handling apparatus 200 can be one or more of physical and/or logical instances of processors 216, central processing units (CPUs) 217, graphics hardware 218, network controllers 219, memory 220, memory management 221, hardware 222, microarchitecture 223, sound cards 224, video cards 225, network interfaces 226, instruction set architecture (ISA) 227, library calls 228, library functions 229, software objects 230, compilers 231, operating systems 232, and the like. In various embodiments and/or applications of the information handling apparatus 200, the operational resources 212 can be one or more entities or phenomena including, for example, power 233, voltage 234, current 235, electrons 236, frequency 237, execution cycles 238, battery consumption 239, battery life 240, constraints 241, temperature 242, and measurable phenomena 243, and the like.

Figure 3C:
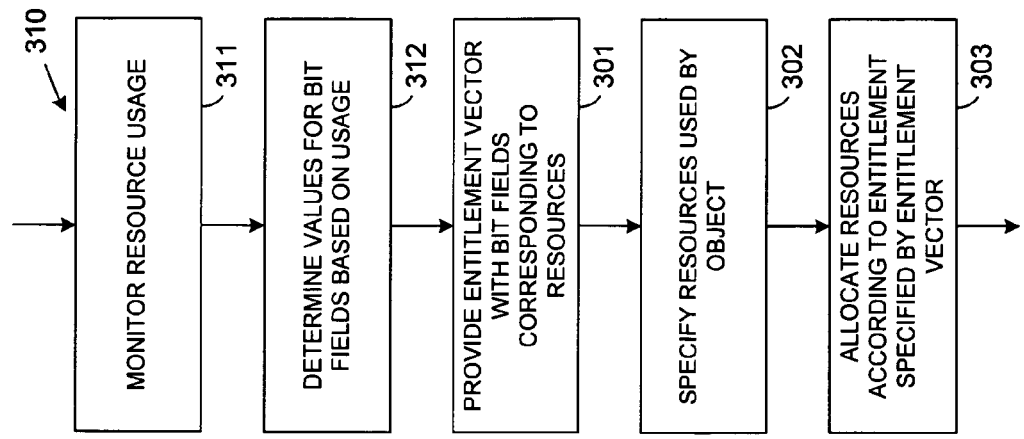
FIGS. 3A through 3W are schematic flow diagrams depicting an embodiment or embodiments of a method operable in an information handling apparatus adapted to facilitate resource allocation using an entitlement vector comprising multiple fields that are respectively directed to multiple different resources.

The entitlement vectors enable data and resource parallelism of multiple objects and processes simultaneously accessing a plurality of resources of various types, wherein operations can be performed on different data. Referring to FIGS. 3A through 3W, schematic flow diagrams depict an embodiment or embodiments of a method operable in an information handling apparatus adapted to facilitate resource allocation using an entitlement vector comprising multiple fields that are respectively directed to multiple different resources. Referring to FIG. 3A, a method 300 for handling information can comprise providing 301 an entitlement vector configured with a plurality of bit fields at least partly corresponding to a plurality of resources, and specifying 302 the resources used by at least one object of a plurality of a plurality of objects. The method 300 can further comprise allocating 303 the resources to the at least one object based on entitlement as specified by the entitlement vector.

In various embodiments, the resources can comprise physical/logical resources and operational resources. The physical/logical resources can comprise at least one of a group consisting of physical and/or logical instances of processors, central processing units (CPUs), graphics hardware, network controllers, memory, memory management, hardware, microarchitecture, sound cards, video cards, network interfaces, instruction set architecture (ISA), library calls, library functions, software objects, compilers, and operating systems. The operational resources can comprise at least one of power, voltage, current, electrons, frequency, execution cycles, battery consumption, battery life, constraints, temperature, and measurable phenomena.

Figure 3B:
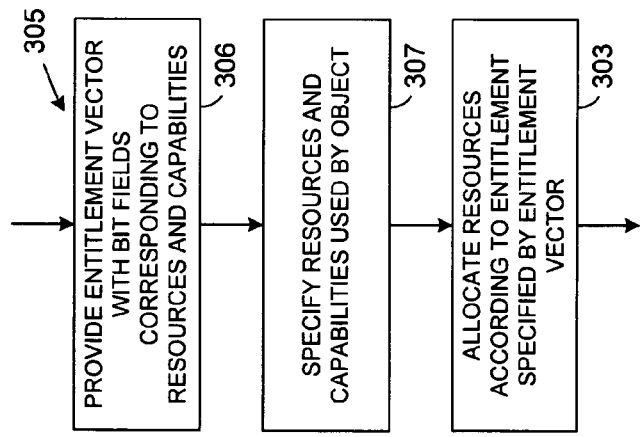
Figure 3A:
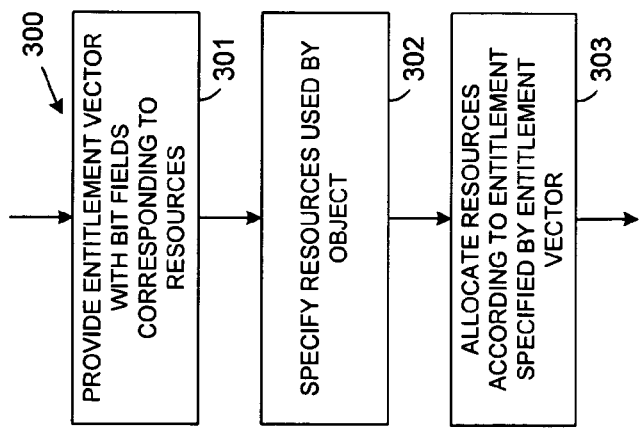
Figure 3I:
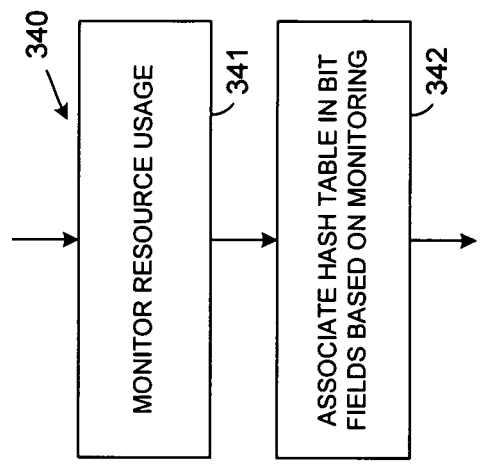
Figure 3H:
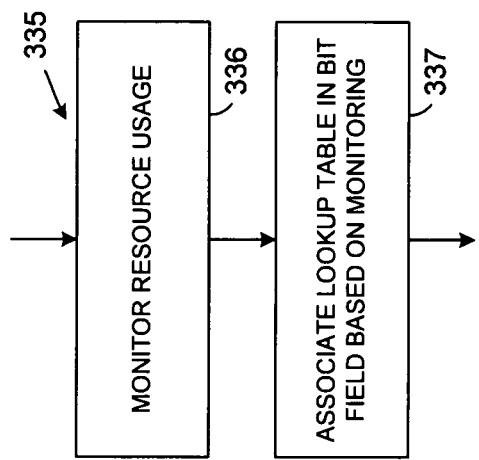

Referring to FIG. 3B, a method 305 for handling information can further comprise providing 306 the entitlement vector comprising a plurality of bit fields respectively directed to a plurality of different resources and capabilities. The method 305 can further comprise specifying 306 the resources and capabilities used by the at least one object.

In various embodiments and/or applications, as illustrated in FIG. 3C, a method 310 for handling information can further comprise monitoring 311 resource usage, and determining 312 values for the bit fields based on the monitoring.

As shown in FIG. 3D, a method 315 for handling information can further comprise monitoring 316 resource usage, and scaling 317 data according to human-perceptible precision. The method 315 can further comprise setting 318 values for the bit fields based on the monitoring and scaling.

In other embodiments and/or applications, as depicted in FIG. 3E, a method 320 for handling information can further comprise monitoring 321 resource usage, scaling 322 data according to physical precision, and setting 323 values for the bit fields based on the monitoring and scaling.

Similarly, illustrated in FIG. 3F, a method 325 for handling information can further comprise monitoring 326 resource usage, and determining 327 values for selected ones of the bit fields based on the monitoring. The method 325 can further comprise setting 328 the selected ones of the bit fields.

Figure 3G:
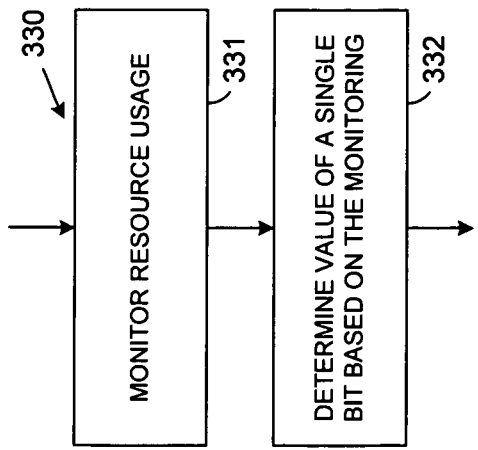
Figure 3L:
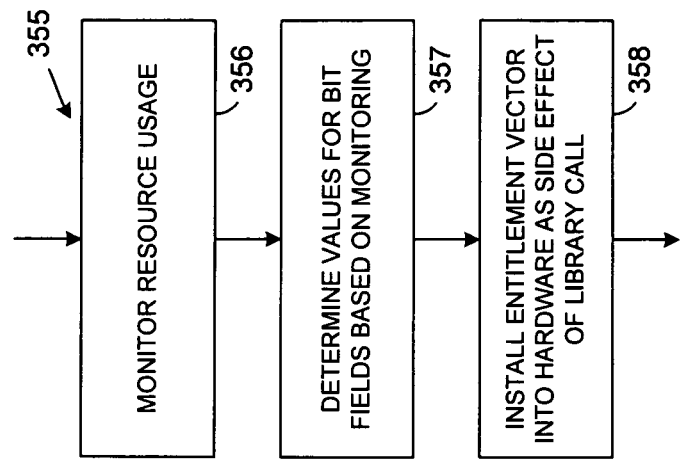
Figure 3K:
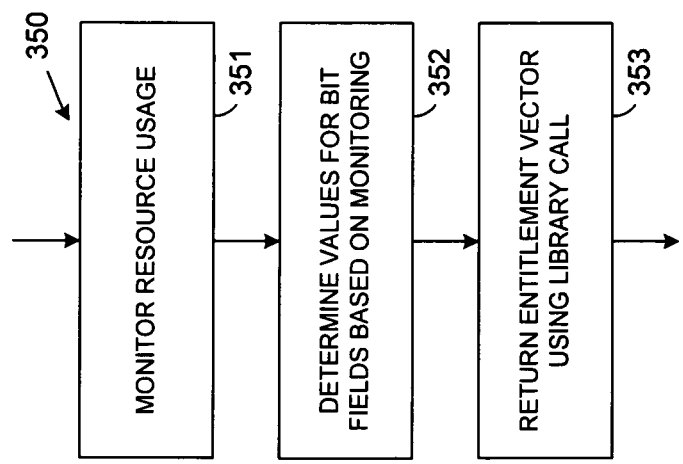

Furthermore, referring to FIG. 3G, a method 330 for handling information can further comprise monitoring 331 resource usage, and determining 332 a value of a single bit of the bit fields based on the monitoring.

In additional embodiments, as shown in FIG. 3H, method 335 for handling information can further comprise monitoring 336 resource usage, and associating 337 a lookup table as at least a portion of the bit fields based on the monitoring.

Referring to FIG. 3I, a method 340 for handling information can further comprise monitoring 341 resource usage, and associating 342 a hash table as at least a portion of the bit fields based on the monitoring.

Figure 3J:
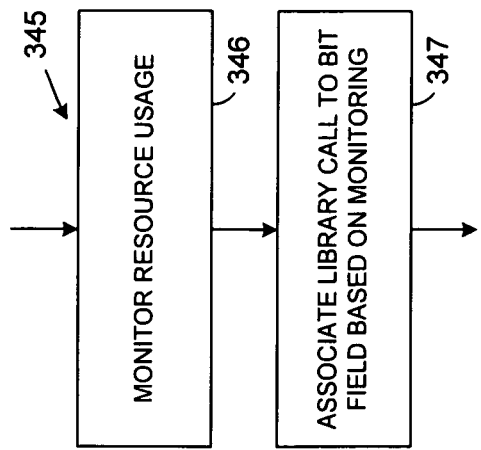
Figure 3O:
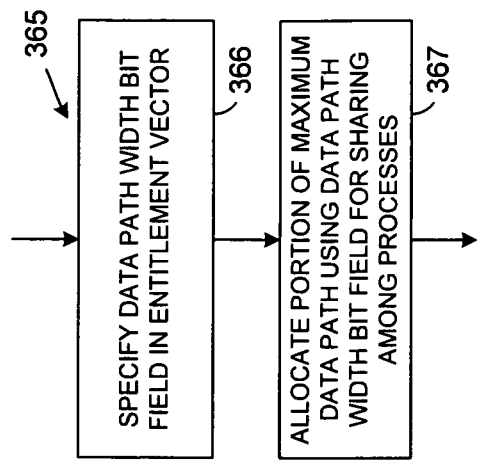
Figure 3N:
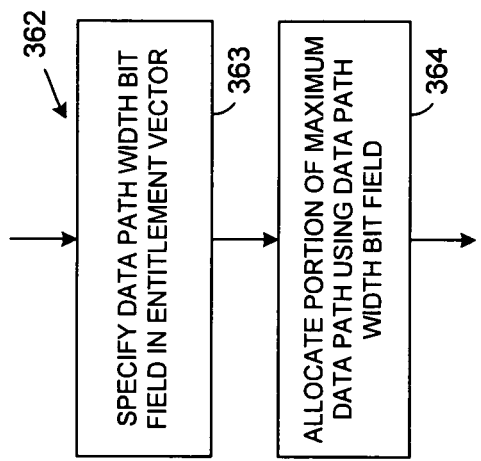

In various embodiments and/or applications, as illustrated in FIG. 3J, a method 345 for handling information can further comprise monitoring 346 resource usage, and associating 347 a library call as at least a portion of the bit fields based on the monitoring.

Various methods can deploy a logic to perform different aspects of operation. For example, as shown in FIG. 3K, a method 350 for handling information can further comprise monitoring 351 resource usage, determining 352 values for the bit fields based on the monitoring, and returning 353 the entitlement vector using a library call.

In other embodiments and/or applications, as depicted in FIG. 3L, a method 355 for handling information can further comprise monitoring 356 resource usage, and determining 357 values for the bit fields based on the monitoring. The method 355 can further comprise installing 358 the entitlement vector into hardware as a side effect of a library call.

Figure 3M:
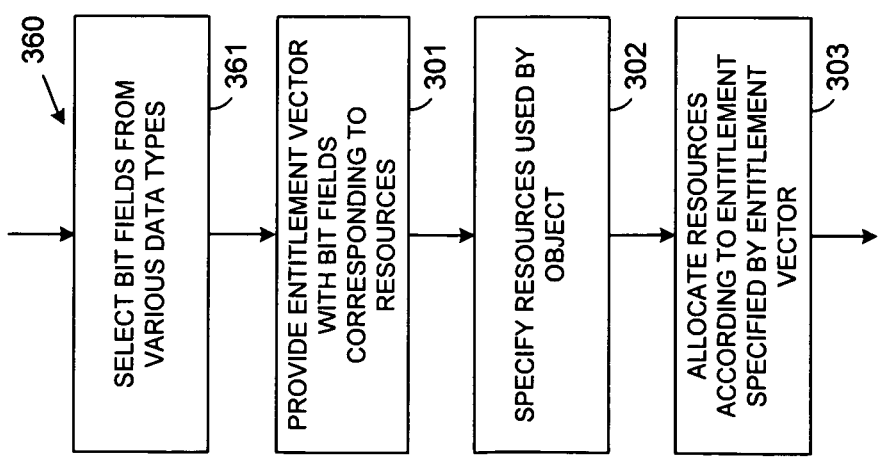
Figure 3R:
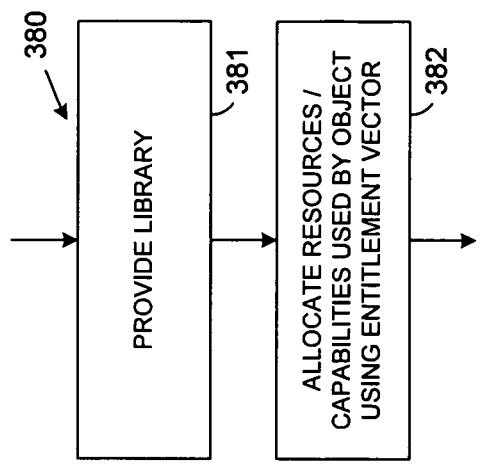
Figure 3Q:
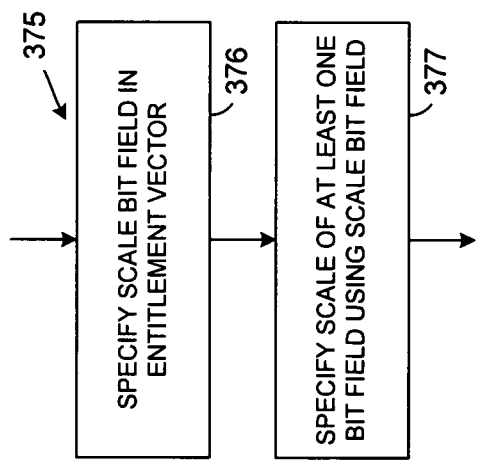

Similarly, illustrated in FIG. 3M, a method 360 for handling information can further comprise selecting 361 the bit fields from data types of a group consisting of integer, floating point, Boolean, characters, strings, numerical values, numerical values indicative of relative resource allocation, complex numbers, tables, and library calls.

Furthermore, referring to FIG. 3N, a method 362 for handling information can further comprise specifying 363 a data path width bit field in the bit fields of the entitlement vector, and requesting 364 allocation of only a portion of a maximum data path width using the data path width bit field.

In additional embodiments, as shown in FIG. 3O, method 365 for handling information can further comprise specifying 366 a data path width bit field in the bit fields of the entitlement vector, and requesting 367 allocation of only a portion of a maximum data path width wherein a plurality of processes share the entitlement vector using the data path width bit field.

Figure 3P:
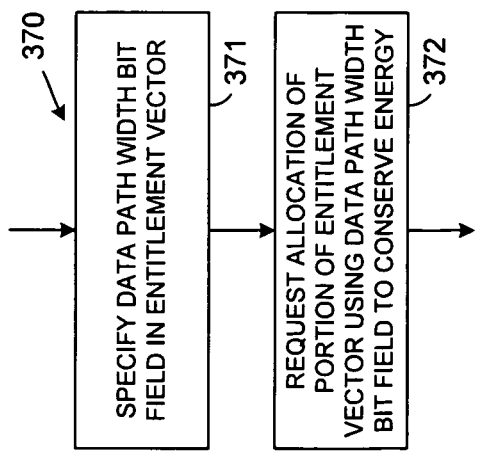
Figure 3U:
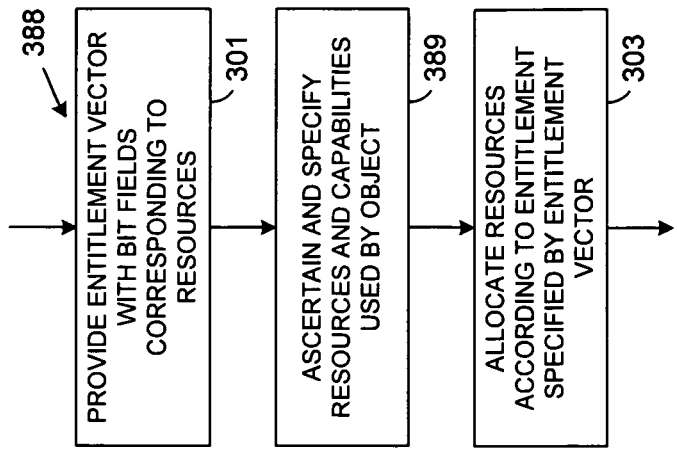
Figure 3T:
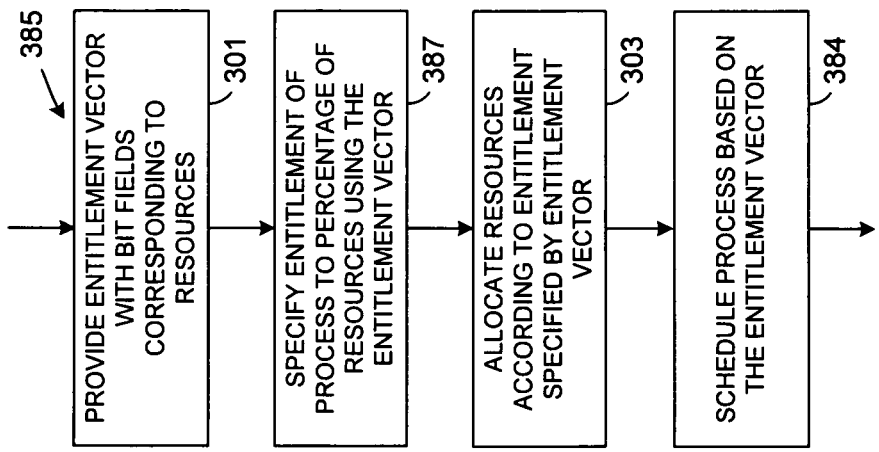

Referring to FIG. 3P, a method 370 for handling information can further comprise specifying 371 a data path width bit field in the bit fields of the entitlement vector, and requesting 372 allocation of only a portion of a maximum data path width wherein a portion of the entitlement vector is deactivated to conserve energy using the data path width bit field.

In various embodiments and/or applications, as illustrated in FIG. 3Q, a method 375 for handling information can further comprise specifying 376 a scale bit field in the bit fields of the entitlement vector, and specifying 377 a scale of at least one of the bit fields using the scale bit field.

As shown in FIG. 3R, a method 380 for handling information can further comprise providing 381 a library, and specifying and/or allocating 382 resources and/or capabilities used by at least one object in the library using the entitlement vector.

Figure 3S:
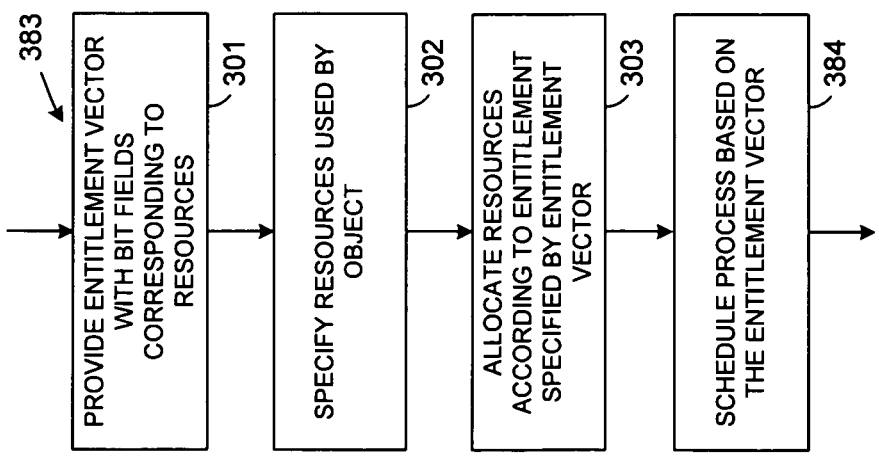
Figures 3V, 3W:
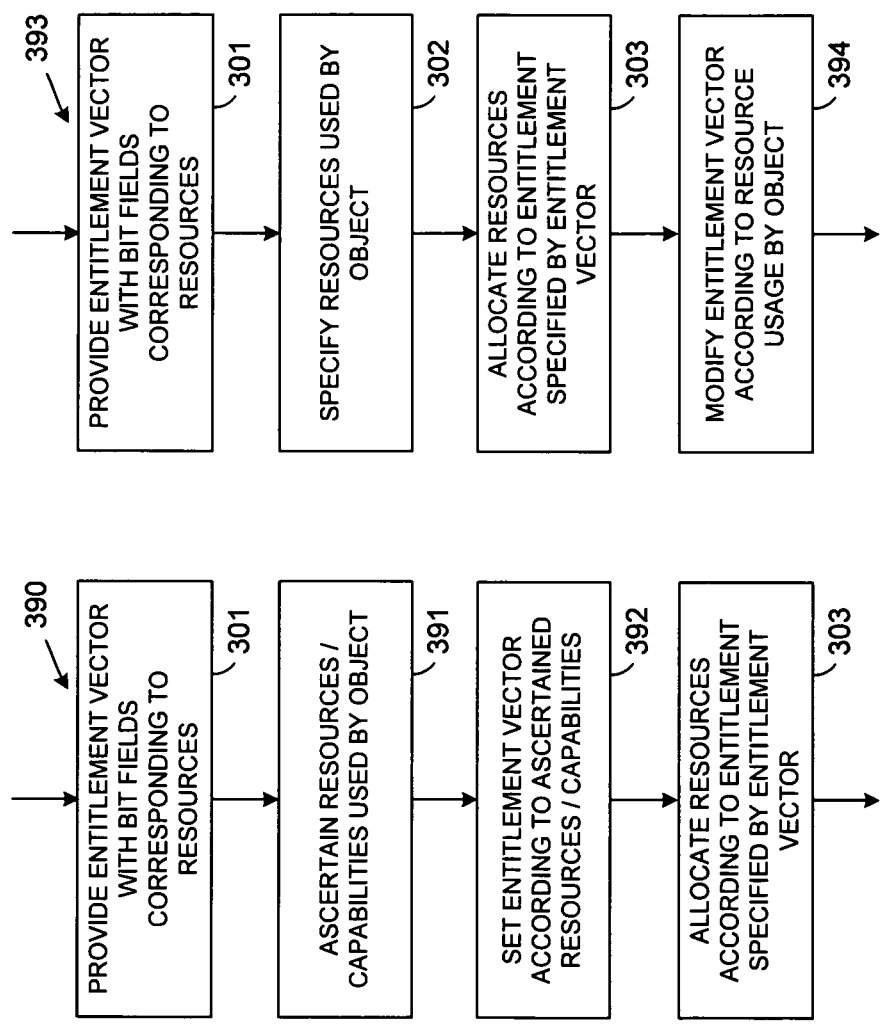

In other embodiments and/or applications, as depicted in FIG. 3S, a method 383 for handling information can further comprise scheduling 384 a process of a plurality of processes based on at least one entitlement vector of a plurality of entitlement vectors.

Similarly, illustrated in FIG. 3T, a method 385 for handling information can further comprise scheduling 386 a process of a plurality of processes based on the entitlement vector, and specifying 387 that the process of the plurality of processes is entitled to a predetermined percentage of operational resources using the entitlement vector.

Furthermore, referring to FIG. 3U, a method 388 for handling information can further comprise ascertaining and specifying 389 resources and capabilities used by the at least one object using the entitlement vector.

In additional embodiments, as shown in FIG. 3V, method 390 for handling information can further comprise ascertaining 391 resources and/or capabilities used by an object of the plurality of objects. The method 390 can further comprise setting 392 the entitlement vector according to the ascertained resources and/or capabilities.

Referring to FIG. 3W, a method 393 for handling information can further comprise dynamically modifying 394 the entitlement vector according to usage of resources by the at least one object of a plurality of a plurality of objects.

Referring to FIGS. 4A through 4K, schematic flow diagrams depict an embodiment or embodiments of a method operable in an information handling apparatus that enables dynamic modification of bit fields in entitlement vectors for allocating resources. Accordingly, in an illustrative embodiment, referring to FIG. 4A, a method 400 for handling information can comprise providing 401 an entitlement vector configured with a plurality of bit fields at least partly corresponding to a plurality of resources, and specifying 402 the resources used by at least one object of a plurality of a plurality of objects. The method 400 can further comprise monitoring 403 resource usage, and determining 404 values for the bit fields based on the monitoring.

In various embodiments, the resources can comprise physical/logical resources and operational resources. The physical/logical resources can comprise at least one of a group consisting of physical and/or logical instances of processors, central processing units (CPUs), graphics hardware, network controllers, memory, memory management, hardware, microarchitecture, sound cards, video cards, network interfaces, instruction set architecture (ISA), library calls, library functions, software objects, compilers, and operating systems. The operational resources can comprise at least one of power, voltage, current, electrons, frequency, execution cycles, battery consumption, battery life, constraints, temperature, and measurable phenomena.

Referring to FIG. 4B, a method 405 for handling information can further comprise providing 406 the entitlement vector comprising a plurality of bit fields respectively directed to a plurality of different resources and capabilities, and specifying 407 the resources and capabilities used by the at least one object.

Several methods can scale values in the bit fields of the entitlement vector to the range of human perception. For example, as shown in FIG. 4C, a method 410 for handling information can further comprise monitoring 411 resource usage, scaling 412 data according to human-perceptible precision, and setting 413 values for the bit fields based on the monitoring and scaling.

Some methods can scale values in the bit fields of the entitlement vector to the range of actual physical phenomena. For example, as shown in FIG. 4D, a method 415 for handling information can further comprise monitoring 416 resource usage, scaling 417 data according to physical precision, and setting 418 values for the bit fields based on the monitoring and scaling.

In additional embodiments, as shown in FIG. 4E, method 420 for handling information can further comprise monitoring 421 resource usage, and determining 422 values for selected ones of the bit fields based on the monitoring. The method 420 can further comprise setting 423 the selected ones of the bit fields.

In further embodiments, depicted in FIG. 4F, a method 425 for handling information can further comprise monitoring 426 resource usage, and determining 427 a value of a single bit of the bit fields based on the monitoring.

Figure 4I:
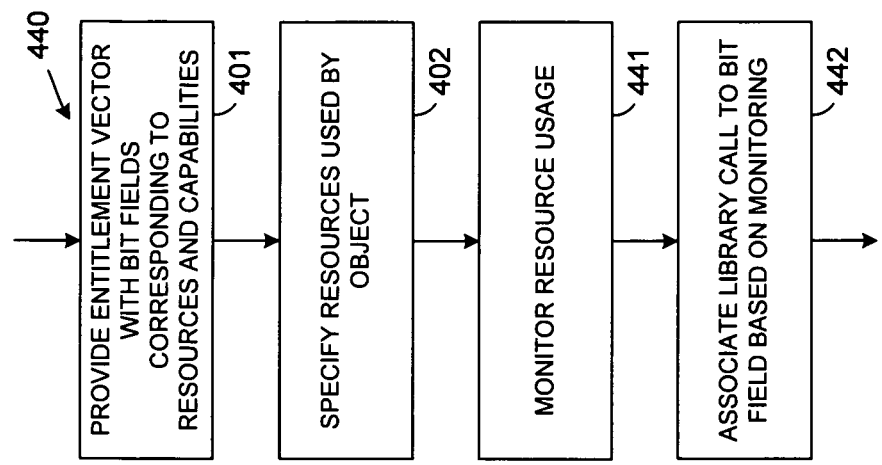
Figure 4H:
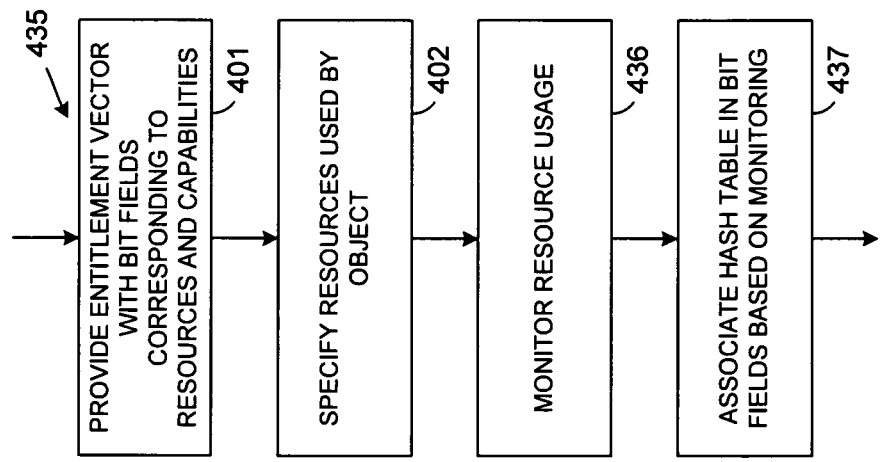
Figure 4G:
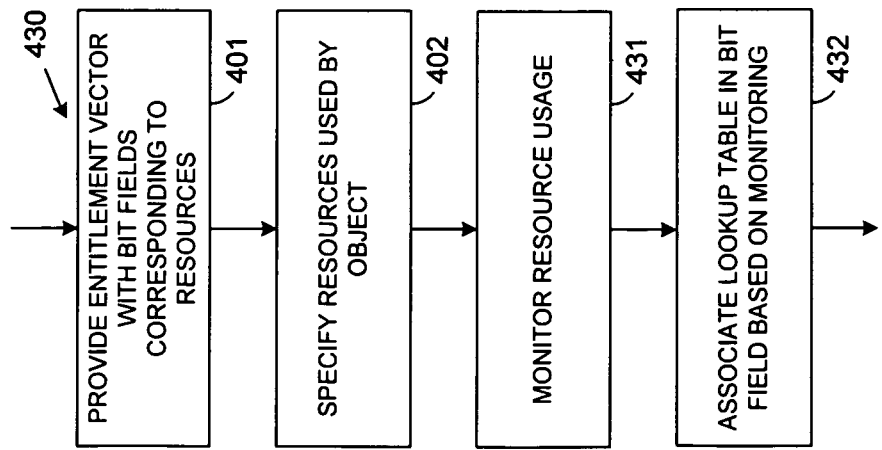

Referring to FIG. 4G, a method 430 for handling information can further comprise monitoring 431 resource usage, and associating 432 a lookup table as at least a portion of the bit fields based on the monitoring.

In various embodiments and/or applications, as illustrated in FIG. 4H, a method 435 for handling information can further comprise monitoring 436 resource usage, and associating 437 a hash table as at least a portion of the bit fields based on the monitoring.

Several methods can use a library and library calls to allocate resources using the bit fields of the entitlement vector. For example, as shown in FIG. 4I, a method 440 for handling information can further comprise monitoring 441 resource usage, and associating 442 a library call as at least a portion of the bit fields based on the monitoring.

Similarly, as shown in FIG. 4J, a method 445 for handling information can further comprise monitoring 446 resource usage, and determining 447 values for the bit fields based on the monitoring. The entitlement vector can be returned 448 using a library call.

Likewise, as shown in FIG. 4K, a method 450 for handling information can further comprise monitoring 451 resource usage, and determining 452 values for the bit fields based on the monitoring. The entitlement vector can be installed 453 into hardware as a side effect of a library call.

Figure 5:
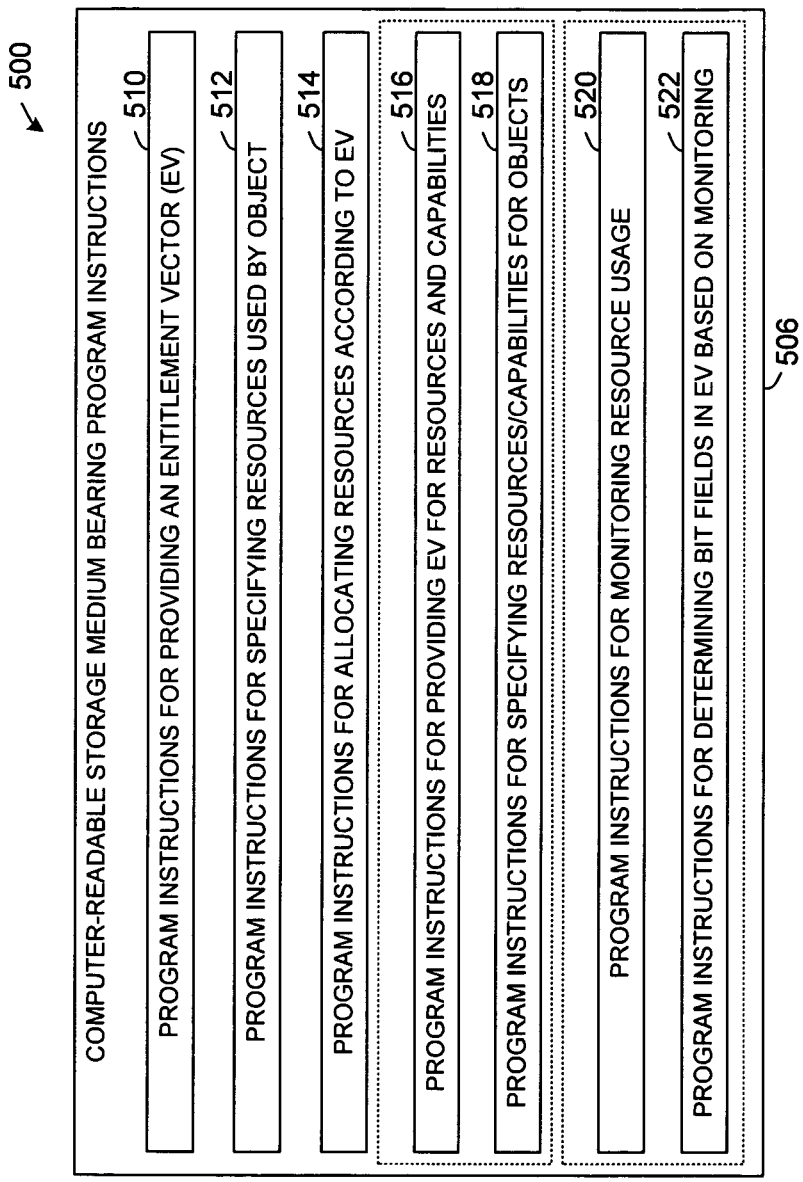
FIG. 5 is a schematic block diagram illustrating an embodiment of a computer program product adapted to facilitate resource allocation using an entitlement vector comprising multiple fields that are respectively directed to multiple different resources.

Referring to FIG. 5, an embodiment comprises a computer program product 500. The computer program product includes a computer-readable storage medium 506 bearing program instructions. The program instructions are operable to perform a process in a computing device. The computer program product can be constituted as any combination of one or more computer usable or computer readable medium (s), for example but not limited to, communication, electronic, semiconductor, magnetic, optical, electromagnetic, infrared, in the form of propagation medium, system, apparatus, device, or the like. Specific examples of the computer-readable medium may include, are not limited to, a wired connection, a wireless connection, Internet or an intranet transmission media, an optical fiber, a magnetic storage device, a portable diskette, a hard disk, a portable compact disc read-only memory (CDROM), an optical storage device, a random access memory (RAM), a read-only memory (ROM), an erasable programmable read-only memory (EPROM), Flash memory, or the like. Similarly, the computer-usable or computer-readable medium can be a visual display such as paper, poster, screen view, that can be visually or electronically captured such as by optical scanning of a medium, then compiled, interpreted, or otherwise processed.

The program instructions can comprise program instructions 510 operable to program instructions operable to provide an entitlement vector configured with a plurality of bit fields at least partly corresponding to a plurality of resources, and program instructions 512 operable to specify the resources used by at least one object of a plurality of a plurality of objects. The program instructions can further comprise program instructions 514 operable to allocate the resources to the at least one object based on entitlement as specified by the entitlement vector.

In some embodiments, the computer program product can further comprise program instructions 516 operable to provide the entitlement vector comprising a plurality of bit fields respectively directed to a plurality of different resources and capabilities. The program instructions can further comprise program instructions 518 operable to specify the resources and capabilities used by the at least one object.

In further embodiments and/or applications, the computer program product can further comprise program instructions 520 operable to monitor resource usage, and program instructions 522 operable to determine values for the bit fields based on the monitoring.

Figure 6:
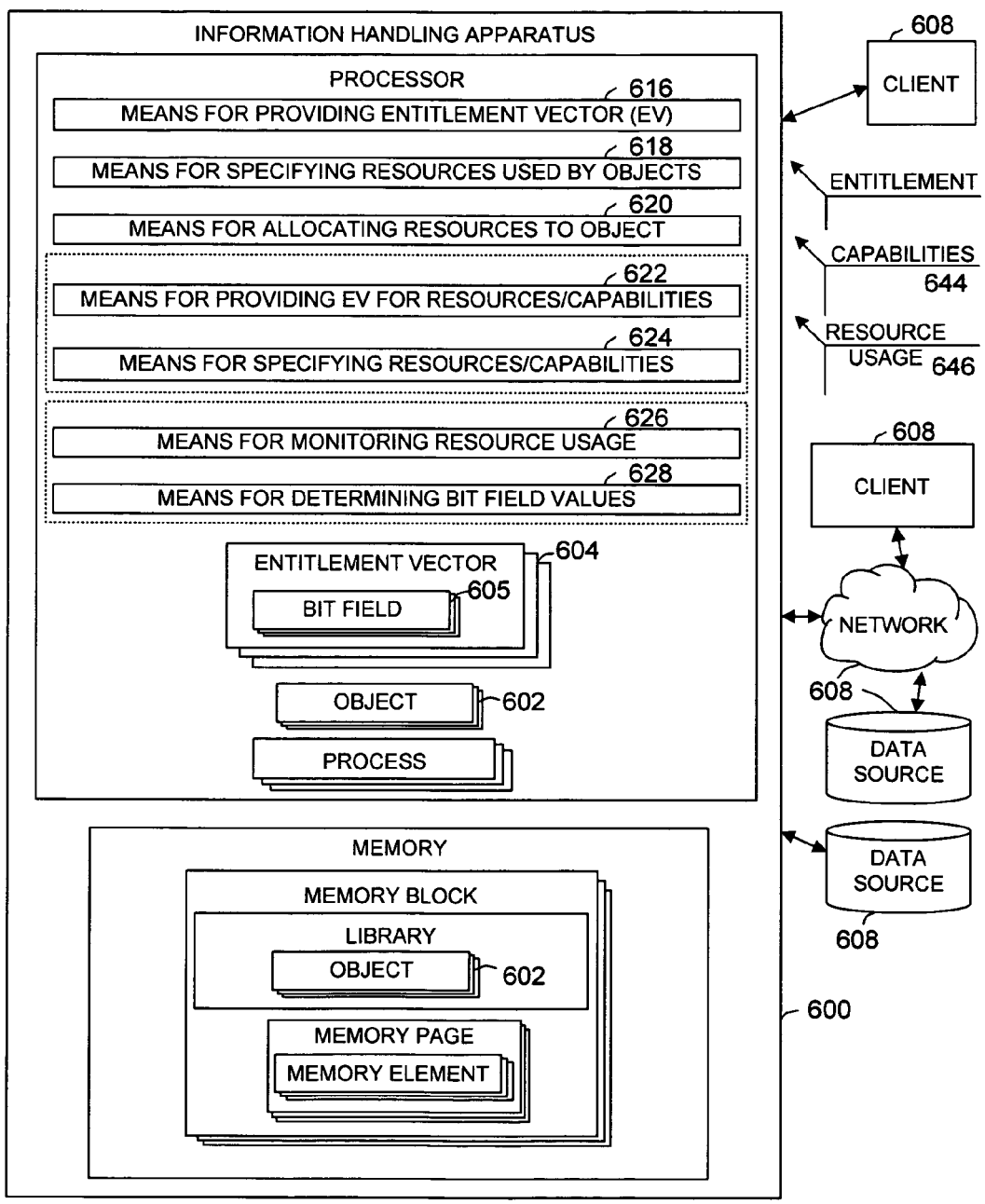
FIG. 6 is a schematic block diagram illustrating an embodiment of an information handling apparatus which is adapted to facilitate resource allocation using an entitlement vector comprising multiple fields that are respectively directed to multiple different resources or capabilities.

Referring to FIG. 6, a schematic block diagram illustrates an embodiment of an information handling apparatus 600 which is adapted to facilitate resource allocation using an entitlement vector comprising multiple fields that are respectively directed to multiple different resources or capabilities. The illustrative information handling apparatus 600 can comprise means 616 for providing an entitlement vector 604 configured with a plurality of bit fields 605 at least partly corresponding to a plurality of resources 608, and means 618 for specifying the resources 608 used by at least one object 602 of a plurality of a plurality of objects 602. The information handling apparatus 600 can further comprise means 620 for allocating the resources 608 to the at least one object 602 based on entitlement as specified by the entitlement vector 604.

In various embodiments, the information handling apparatus 600 can further comprise means 622 for providing the entitlement vector 604 comprising a plurality of bit fields 605 respectively directed to a plurality of different resources and capabilities 644, and means 624 for specifying the resources 608 and capabilities 644 used by the at least one object 602.

In further embodiments and/or applications, the information handling apparatus 600 can further comprise means 626 for monitoring resource usage 646, and means 628 for determining values for the bit fields 605 based on the monitoring.

Terms "substantially", "essentially", or "approximately", that may be used herein, relate to an industry-accepted variability to the corresponding term. Such an industry-accepted variability ranges from less than one percent to twenty percent and corresponds to, but is not limited to, materials, shapes, sizes, functionality, values, process variations, and the like. The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

The illustrative pictorial diagrams depict structures and process actions in a manufacturing process. Although the particular examples illustrate specific structures and process acts, many alternative implementations are possible and commonly made by simple design choice. Manufacturing actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, shapes, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

The invention claimed is:
1. An information handling apparatus comprising:
at least one processor; and
one or more entitlement vectors configured with one or more bit fields respectively directed to one or more different resources or capabilities and configured to specify the one or more different resources or capabilities used by at least one object of two or more objects wherein the at least one processor is configured to:
initiate one or more library calls which returns and installs into hardware in the at least one processor at least one of the one or more entitlement vectors;
monitor resource usage, scale data of the one or more bit fields associated with the monitoring according to physical precision, and set one or more values for the one or more bit fields based on the monitoring;

associate at least one of the one or more library calls as at least a portion of the one or more bit fields based on the monitoring; and allocate the one or more different resources or capabilities to the at least one object based on entitlement as specified by the one or more entitlement vectors.

2. The information handling apparatus according to claim 1 wherein:

one or more of the at least one processor is configured to scale the data of the one or more bit fields according to human-perceptible precision.

3. The information handling apparatus according to claim 1 wherein:

one or more of the at least one processor is configured to scale the data of the one or more bit fields according to physical precision determined by measurement capabilities of measurement hardware, and set one or more values for the one or more bit fields based on the monitoring and scaling.

4. The information handling apparatus according to claim 1 wherein:

one or more of the at least one processor is configured to determine one or more values for selected portions of the one or more bit fields based on the monitoring, and set the selected portions of the one or more bit fields.

5. The information handling apparatus according to claim 1 wherein:

one or more of the at least one processor is configured to determine a value of a single bit of the one or more bit fields based on the monitoring.

6. The information handling apparatus according to claim 1 wherein:

one or more of the at least one processor is configured to associate at least one lookup table as at least a portion of the one or more bit fields based on the monitoring.

7. The information handling apparatus according to claim 1 wherein:

one or more of the at least one processor is configured to associate at least one hash table as at least a portion of the one or more bit fields based on the monitoring, the at least one hash table configured to allocate a level of entitlement per memory block, and reduce one or more bits in the at least one of the one or more hash tables by using a memory location at a hash of an address to compress the address.

8. The information handling apparatus according to claim 1 wherein:

one or more of the at least one processor is configured to determine one or more values for the one or more bit fields based on the monitoring, wherein at least one of the one or more library calls returns at least one of the one or more entitlement vectors.

9. The information handling apparatus according to claim 1 wherein:

one or more of the at least one processor is configured to determine one or more values for the one or more bit fields based on the monitoring, and install at least one of the one or more entitlement vectors into hardware as a side effect of at least one of the one or more library calls.

10. The information handling apparatus according to claim 1 wherein the one or more bit fields include one or more data types selected from at least:

integer, floating point, Boolean, characters, strings, numerical values, numerical values indicative of relative resource allocation, complex numbers, tables, or library calls.

11. The information handling apparatus according to claim 1 wherein the one or more different resources or capabilities include at least:

physical/logical resources or operational resources.

12. The information handling apparatus according to claim 11 wherein the physical/logical resources include at least physical and/or logical instances of:

processors, central processing units (CPUs), graphics hardware, network controllers, memory, memory management, hardware, microarchitecture, sound cards, video cards, network interfaces, instruction set architecture (ISA), library calls, library functions, software objects, compilers, or operating systems.

13. The information handling apparatus according to claim 11 wherein the operational resources include at least one of:

power, voltage, current, electrons, frequency, execution cycles, battery consumption, battery life, constraints, temperature, or measurable phenomena.

14. The information handling apparatus according to claim 1 wherein the one or more bit fields of the one or more entitlement vectors include at least:

a data path width bit field configured to request allocation of only a portion of a maximum data path width.

15. The information handling apparatus according to claim 1 wherein the one or more bit fields of the one or more entitlement vectors include at least:

at least one data path width bit field configured to request allocation of only a portion of a maximum data path width wherein a plurality of processes share at least one of the one or more entitlement vectors.

16. The information handling apparatus according to claim 1 wherein the one or more bit fields of the one or more entitlement vectors include at least:

at least one data path width bit field configured to request allocation of only a portion of a maximum data path width wherein a portion of at least one of the one or more entitlement vectors is deactivated to conserve energy.

17. The information handling apparatus according to claim 1 wherein the one or more bit fields of the one or more entitlement vectors include at least:

a scale bit field operable to specify a scale of at least one of the one or more bit fields.

18. The information handling apparatus according to claim 1 further comprising:

one or more libraries wherein at least one of the one or more entitlement vectors specifies and/or allocates resources or capabilities used by at least one object in the one or more libraries.

19. The information handling apparatus according to claim 1 further comprising:

at least one scheduler configured to schedule at least one of one or more processes based on at least one of the one or more entitlement vectors.

20. The information handling apparatus according to claim 1 further comprising:

at least one scheduler configured to schedule at least one of one or more processes based on at least one of the one or more entitlement vectors wherein the at least one of the one or more entitlement vectors specifies that the at least one of one or more processes is entitled to a predetermined percentage of one or more operational resources.

21. The information handling apparatus according to claim 1 wherein:

at least one of the one or more entitlement vectors is configured to identify and specify one or more different resources or capabilities used by the at least one object.

22. The information handling apparatus according to claim 1 wherein:
one or more of the at least one processor is configured to identify resources or capabilities used by the at least one object of the two or more objects and further configured to set at least one of the one or more entitlement vectors according to the identified resources or capabilities.

23. The information handling apparatus according to claim 1 wherein:
one or more of the at least one processor is configured to dynamically modify at least one of the one or more entitlement vectors according to usage of resources by the at least one object of the two or more objects.

24. The information handling apparatus according to claim 1 wherein the at least one processor comprises at least one of one or more physical processors, one or more logical processors, or one or more virtual machines.

25. An information handling apparatus comprising:
at least one processor; and
one or more entitlement vectors configured with one or more bit fields respectively directed to one or more different resources or capabilities and configured to specify the one or more different resources or capabilities used by at least one object of two or more objects wherein the at least one processor is configured to:
monitor resource usage over time and set one or more values for the one or more bit fields based on the monitoring;
associate at least one hash table as at least a portion of the one or more bit fields based on the monitoring;
indicate a level of entitlement per memory portion in the at least one hash table to reduce the number of bits allocated to the at least one hash table; and
allocate the one or more different resources or capabilities to the at least one object based on entitlement as specified by the entitlement vector.

26. The information handling apparatus according to claim 25 wherein:
the at least one processor is configured to scale the data according to human-perceptible precision, and set one or more values for the one or more bit fields based on the monitoring and scaling.

27. The information handling apparatus according to claim 25 wherein:
the at least one processor is configured to scale data according to physical precision determined by measurement capabilities of measurement hardware, and set one or more values for the one or more bit fields based on the monitoring and scaling.

28. The information handling apparatus according to claim 25 wherein:
the at least one processor is configured to determine one or more values for selected portions of the one or more bit fields based on the monitoring, and set the selected portions of the one or more bit fields.

29. The information handling apparatus according to claim 25 wherein:
the at least one processor is configured to determine a value of a single bit of the one or more bit fields based on the monitoring.

30. The information handling apparatus according to claim 25 wherein:
the at least one processor is configured to indicate a level of entitlement per memory portion in the at least one hash table to reduce the number of bits allocated to the at least one hash table wherein the at least one processor uses memory at the hash of a memory address to compress the address.

31. An information handling apparatus comprising:
means for processing data;
means for specifying in one or more entitlement vectors configured with one or more bit fields respectively directed to one or more different resources or capabilities the one or more different resources or capabilities used by at least one object of two or more objects;
means for initiating one or more library calls which returns and installs into hardware in the means for processing data at least one of the one or more entitlement vectors;
means for monitoring resource usage, scaling data of the one or more bit fields associated with the monitoring according to physical precision, and setting values for the one or more bit fields based on the monitoring;
means for associating at least one of the one or more library calls as at least a portion of the one or more bit fields based on the monitoring; and
means for allocating the one or more different resources or capabilities to the at least one object based on entitlement as specified by the one or more entitlement vectors.

32. The information handling apparatus according to claim 31 further comprising:
means for associating one or more hash tables as at least a portion of the one or more bit fields based on the monitoring;
means for indicating a level of entitlement per memory portion in the at least one hash table to reduce the number of bits allocated to the at least one hash table; and
means for allocating the one or more different resources or capabilities to the at least one object based on entitlement as specified by the entitlement vector.

* * * * *